US011963576B2

(12) United States Patent
Kita et al.

(10) Patent No.: US 11,963,576 B2
(45) Date of Patent: Apr. 23, 2024

(54) SOLE STRUCTURE FOR A SHOE, SHOE HAVING SAME, AND METHOD FOR MANUFACTURING SAME

(71) Applicant: Mizuno Corporation, Osaka (JP)

(72) Inventors: Kenjiro Kita, Osaka (JP); Takao Oda, Osaka (JP); Natsuki Sato, Osaka (JP); Yo Kajiwara, Osaka (JP); Shingo Sudo, Osaka (JP)

(73) Assignee: MIZUNO CORPORATION, Osaka (JP)

( * ) Notice: Subject to any disclaimer, the term of this patent is extended or adjusted under 35 U.S.C. 154(b) by 0 days.

(21) Appl. No.: 17/209,490

(22) Filed: Mar. 23, 2021

(65) Prior Publication Data
US 2021/0298415 A1    Sep. 30, 2021

(30) Foreign Application Priority Data

Mar. 30, 2020 (JP) ................. 2020-059402

(51) Int. Cl.
*A43B 13/18* (2006.01)
*A43B 13/02* (2022.01)
(Continued)

(52) U.S. Cl.
CPC .......... *A43B 13/181* (2013.01); *A43B 13/026* (2013.01); *A43B 13/12* (2013.01);
(Continued)

(58) Field of Classification Search
CPC ..... A43B 13/20; A43B 13/181; A43B 13/026; A43B 13/12; A43B 13/141; A43B 13/186
See application file for complete search history.

(56) References Cited

U.S. PATENT DOCUMENTS 5,014,449 A    5/1991  Richard et al.
10,589,671 B1*  3/2020  Ali ........................ B60N 2/976
(Continued)

FOREIGN PATENT DOCUMENTS

CN      110722793 A    1/2020
JP      1989-86902 A   3/1989
(Continued)

OTHER PUBLICATIONS

Japanese Office Action for corresponding application 2020-059402 dated Dec. 27, 2023.

*Primary Examiner* — Sharon M Prange
*Assistant Examiner* — Haley A Smith
(74) *Attorney, Agent, or Firm* — CANTOR COLBURN LLP

(57) ABSTRACT

A sole structure for a shoe includes an upper wall portion disposed on the upper side, a lower wall portion disposed below and away from the upper wall portion, and a sidewall portion that is disposed between the upper wall portion and the lower wall portion and that is elastically deformable in the vertical direction. The upper and lower wall portions and the sidewall portion are formed of resin-made wall-shaped members. A three-dimensional elastic fiber structure formed of resin fibers is provided in the interior region between the upper wall portion and the lower wall portion. The interior region includes a hollow portion that is in contact with the three-dimensional elastic fiber structure via a partition wall formed of a resin-made wall-shaped member.

7 Claims, 19 Drawing Sheets

(51) Int. Cl.
  *A43B 13/12*    (2006.01)
  *B29C 64/118*   (2017.01)
  *B33Y 10/00*    (2015.01)
  *B33Y 80/00*    (2015.01)

(52) U.S. Cl.
  CPC ............ *B33Y 80/00* (2014.12); *B29C 64/118* (2017.08); *B33Y 10/00* (2014.12)

(56) References Cited

U.S. PATENT DOCUMENTS

| | | | |
|---|---|---|---|
| 2005/0034330 A1* | 2/2005 | Baychar | A43B 23/07 |
| | | | 36/55 |
| 2011/0277347 A1* | 11/2011 | Monfils | A43B 13/20 |
| | | | 36/29 |
| 2012/0102783 A1* | 5/2012 | Swigart | B29D 35/142 |
| | | | 12/146 B |
| 2014/0053427 A1* | 2/2014 | Patton | A43B 13/188 |
| | | | 12/146 B |
| 2015/0013190 A1* | 1/2015 | Davison | A43B 13/185 |
| | | | 36/102 |
| 2016/0295968 A1* | 10/2016 | Campos, II | A43B 13/20 |
| 2019/0125029 A1* | 5/2019 | Edwards | A43B 23/0225 |
| 2019/0150562 A1* | 5/2019 | Bartel | A43B 13/22 |
| 2019/0200699 A1* | 7/2019 | Ghiotti | A43B 17/006 |
| 2022/0225731 A1* | 7/2022 | Mkumba | A43B 13/189 |

FOREIGN PATENT DOCUMENTS

| | | |
|---|---|---|
| JP | 2004-242692 A | 9/2004 |
| JP | 2020-14722 A | 1/2020 |

* cited by examiner

FIG. 25A
FIG. 25B
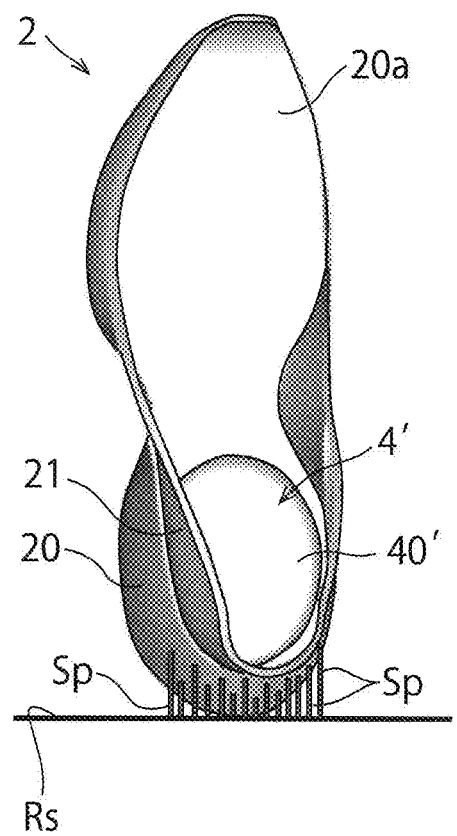
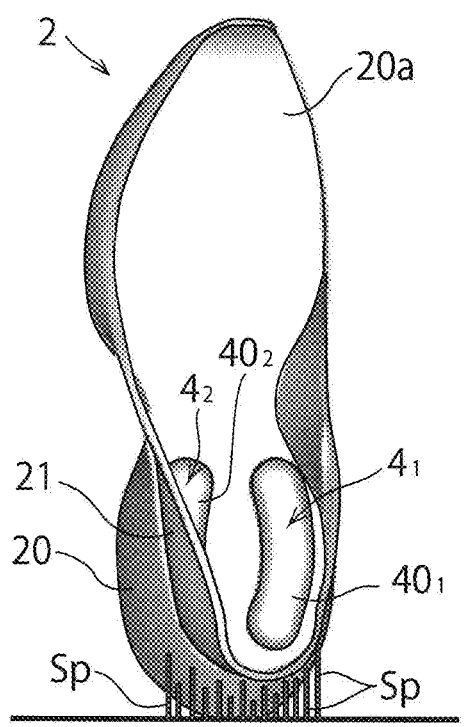

SOLE STRUCTURE FOR A SHOE, SHOE HAVING SAME, AND METHOD FOR MANUFACTURING SAME

BACKGROUND OF THE INVENTION

The present invention relates generally to a sole structure for a shoe that can easily control cushioning property and stability with a simple structure, to a shoe having the sole structure, and to a method for manufacturing the sole structure.

As a sole structure for a shoe, for example, Japanese patent application publication No. 2004-242692 discloses a sole structure that comprises an upper midsole formed of a soft elastic member, a lower midsole disposed below the upper midsole and formed of a soft elastic member, and a wavy plate disposed between the upper midsole and the lower midsole and formed of a hard elastic member (see para. [0025]). The upper and lower midsoles are formed of foamed ethylene-vinyl acetate copolymer (EVA) or the like, and the wavy plate is formed of hard synthetic rubber or the like (see paras. [0026]-[0027]).

In the above-mentioned prior-art sole structure, at the time of striking onto the ground, cushioning property can be maintained by compressive deformation of the upper and lower midsoles of soft elastic members. On the other hand, during compressive deformation of the upper and lower midsoles, the wavy plate formed of hard elastic member restricts compressive deformation of the entire upper and lower midsoles thus improving stability on landing.

However, according to the above-mentioned prior-art constitution, the structure is complicated because the wavy plate needs to be provided in addition to the upper and lower midsoles. Also, since a molding process, a bonding process and the like for the wavy plate are further needed, a manufacturing cost increases. The above publication describes that there is formed a cushioning hole in the lower midsole. In that case, since the cushioning hole is formed at a boundary surface between the upper midsole and the lower midsole, the upper midsole is needed in addition to the lower midsole. In the event that the wavy plate forms a part of a top/bottom inner wall surface of the cushioning hole, the wavy plate is also needed in addition to the upper and lower midsoles. Furthermore, in that case, since the position of the cushioning hole is restricted by the wavy plate disposed in the upper/lower midsole, there is a certain limitation in controlling the cushioning property by such a cushioning hole.

The present invention has been made in view of these circumstances and its object is to provide a sole structure for a shoe and a shoe having the sole structure that can easily control cushioning property and stability with a simple structure. Also, the object of the present invention is to provide a sole structure for a shoe and a shoe having the sole structure that can improve an excessive-deformation resistance against an excessive compression during loading. Moreover, the current invention is directed to providing a method for manufacturing such a sole structure.

Other objects and advantages of the present invention will be obvious and appear hereinafter.

SUMMARY OF THE INVENTION

A sole structure for a shoe according to the present invention includes an upper wall portion disposed on an upper side, a lower wall portion disposed below and away from the upper wall portion, and a sidewall portion that is disposed between the upper wall portion and the lower wall portion and that is elastically deformable in a vertical direction. The upper and lower wall portions and the sidewall portion are formed of a resin-made wall-shaped member. A three-dimensional elastic fiber structure formed of resin fibers is provided in an interior region between the upper wall portion and the lower wall portion. The interior region includes a hollow portion that is in contact with the three-dimensional elastic fiber structure via a partition wall formed of a resin-made wall-shaped member.

According to the sole structure of the present invention, at the time of impacting the ground, not only the sidewall portion elastically deforms in the vertical direction but also the three-dimensional elastic fiber structure elastically deforms in the interior region between the upper wall portion and the lower wall portion, thereby exhibiting a cushioning property. At this time, since the upper and lower wall portions are formed of a resin-made wall-shaped member, during elastic deformation of the sidewall portion and the three-dimensional elastic fiber structure, the upper and lower wall portions restrict the elastic deformation of the sidewall portion and the three-dimensional elastic fiber structure, thus improving stability on landing.

Moreover, according to the present invention, since there is provided a hollow portion in contact with the three-dimensional elastic fiber structure in the interior region between the upper wall portion and the lower wall portion, the hollow portion can control elastic deformation of the three-dimensional elastic fiber structure when the three-dimensional elastic fiber structure elastically deforms, thus controlling cushioning property and stability of the sole structure. Furthermore, in this case, when the sole structure is about to excessively compressively deform due to an excessive compressive load that acts at the time of mechanical compression such as landing or shoemaking, excessive deformation against such an excessive compression can be prevented from occurring because the hollow portion provided in the interior region between the upper wall portion and the lower wall portion has a partition wall formed of a wall-shaped member, thus improving an excessive-deformation resistance. Also, in this case, not only a weight saving can be achieved but also a control of cushioning property and stability can be facilitated by a simple structure without providing another member.

The sidewall portion may extend substantially in the vertical direction and connect between the upper wall portion and the lower wall portion. The upper and lower wall portions and the sidewall portion may constitute a box-shaped member, and the hollow portion may be disposed inside the box-shaped member. In this case, since the sidewall portion is connected to the upper and lower wall portions, the upper and lower wall portions can directly restrain elastic deformation of the sidewall portion when the sidewall portion deforms elastically. As a result, stability on landing can be further improved. Also, in this case, since the hollow portion is disposed inside the box-shaped member made of the upper and lower wall portions and the sidewall portion, a variety of shapes can be employed as a hollow portion. Thereby, a more delicate control of cushioning and stability of the sole structure becomes possible.

The hollow portion may go through the sole structure in a lateral direction. In this case, not only the sole structure can be made further lighter in weight but also the direction of deformation of the sole structure can be easily controlled according to the shape, disposition or the like of the hollow portion.

At least a part of an inside wall surface of the partition wall of the hollow portion may be formed of a circular arc-shaped surface, a curved surface, a conical surface, or a pyramidal surface. In this case, when the circular arc-shaped surface, the curved surface, the conical surface, or the pyramidal surface is disposed at e.g. an upper surface of the inside wall surface of the partition wall of the hollow portion, it becomes possible that a planar surface is not disposed at the upper surface of the inside wall surface of the partition wall of the hollow portion. As a result, when resin-molding the partition wall through e.g. a 3D printer, the upper surface of the inside wall surface of the partition wall can be formed without a support or a support member that supports the upper surface from below.

The three-dimensional elastic fiber structure may be formed by an additive manufacturing through a 3D printer together with the respective wall-shaped portions of the upper and lower wall portions, the sidewall portion and the hollow portion. In this case, the sole structure can be integrally formed using the 3D printer thus reducing a manufacturing cost.

The 3D printer may be a fused-deposition-modeling type.

A shoe according to the present invention may comprise the above-mentioned sole structure and an upper, a bottom part of which is fixedly attached to the sole structure.

In a method for manufacturing a sole structure for a shoe according to the present invention, the sole structure may comprise an upper wall portion disposed on an upper side of the sole structure, a lower wall portion disposed below and away from the upper wall portion, and a sidewall portion disposed between the upper wall portion and the lower wall portion and elastically deformable in a vertical direction. The method may comprise the following steps:
  i) Resin-molding the upper and lower wall portions and the sidewall portion respectively as a wall-shaped member using a 3D printer; and
  ii) Forming a three-dimensional elastic fiber structure of a resin fiber in an interior region between the upper wall portion and the lower wall portion during the resin-molding process and also forming a hollow portion in contact with the three-dimensional elastic fiber structure through a partition wall formed of a resin-made wall-shaped member during the resin-molding process, whereby the wall-shaped members of the upper and lower wall portions and the sidewall portion and the partition wall of the hollow portion are integrally formed with the three-dimensional elastic fiber structure.

According to the present invention, since the sole structure can be integrally formed using the 3D printer, thus decreasing a cost.

At least a part of an inner wall surface of the partition wall of the hollow portion may be formed of a circular arc-shaped surface, a curved surface, a conical surface, or a pyramidal surface, and at the time of molding the sole structure by a 3D printer, a posture of the sole structure relative to a reference plane during molding of the sole structure may be selected according to the shape of the inner wall surface. In this case, when the posture of the sole structure relative to the reference plane during molding is properly selected, the inner wall surface of the partition wall of the hollow portion can be formed without a support or a support member.

The forming of the sole structure by the 3D printer may be performed using a soft material having an Asker A hardness of 90A or less.

The 3D printer may be a fused-deposition-modeling type.

As above-mentioned, according to the present invention, when the sole structure impacts the ground, the sidewall portion elastically deforms in the vertical direction and the three-dimensional elastic fiber structure elastically deforms in the interior region between the upper wall portion and the lower wall portion, thus exhibiting cushioning property. At the same time, the upper and lower wall portions restrain elastic deformation of the sidewall portion and the three-dimensional elastic fiber structure, thus improving stability on landing. Also, at the time of elastic deformation of the three-dimensional elastic fiber structure, the hollow portion can control elastic deformation of the three-dimensional elastic fiber structure, thereby controlling cushioning property and stability of the sole structure. Moreover, when the sole structure is about to excessively compressively deform due to an excessive compressive load that acts at the time of mechanical compression such as landing or shoemaking, excessive deformation against such an excessive compression can be prevented from occurring because the hollow portion provided in the interior region between the upper wall portion and the lower wall portion has a partition wall formed of a wall-shaped member, thus improving an excessive-deformation resistance. Furthermore, provision of such a hollow portion can not only achieve weight saving but also control cushioning property and stability easily by a simple structure.

BRIEF DESCRIPTION OF THE DRAWINGS

For a more complete understanding of the invention, reference should be made to the embodiments illustrated in greater detail in the accompanying drawings and described below by way of examples of the invention.

FIG. 25A illustrates an example of a molding method of the sole structure of FIG. 15.

FIG. 25B illustrates an example of a molding method of the sole structure of FIG. 11.

DETAILED DESCRIPTION OF THE PREFERRED EMBODIMENTS

Figure 1:
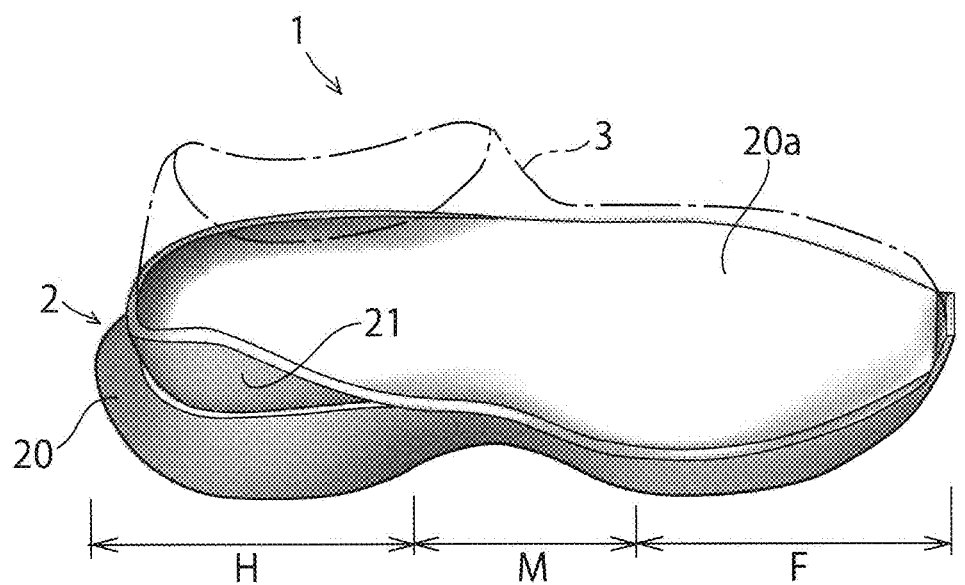
FIG. 1 is a general top perspective medial-side view of a sole structure of a shoe (for a left foot) according to an embodiment of the present invention.

The present invention will now be described in detail with reference to embodiments there of as illustrated in the accompanying drawings.

Referring to the drawings, FIGS. 1 to 8 show a sole structure for a shoe according to an embodiment of the present invention. Here, a running shoe is taken for an example as a shoe. In the following explanations, "upward (upper side/top/upper)" and "downward (lower side/bottom/lower)" designate an upward direction and a downward direction, respectively, or vertical direction of the shoe, "forward (front side/front/anterior)" and "rearward (rear side/rear/posterior)" designate a forward direction and a rearward direction, respectively, or longitudinal direction of the shoe, and "a width or lateral direction" designates a crosswise direction or transverse direction of the sole. For example, when FIG. 3, or a top plan view of the sole structure, is taken as an example, "upward" and "downward" generally designate "out of the page" and "into the page" of FIG. 3, respectively, "forward" and "rearward" generally designate "right to left direction" in FIG. 3, respectively, and "a width direction" generally designates "upward" and "downward" in FIG. 3, respectively.

Figure 2:
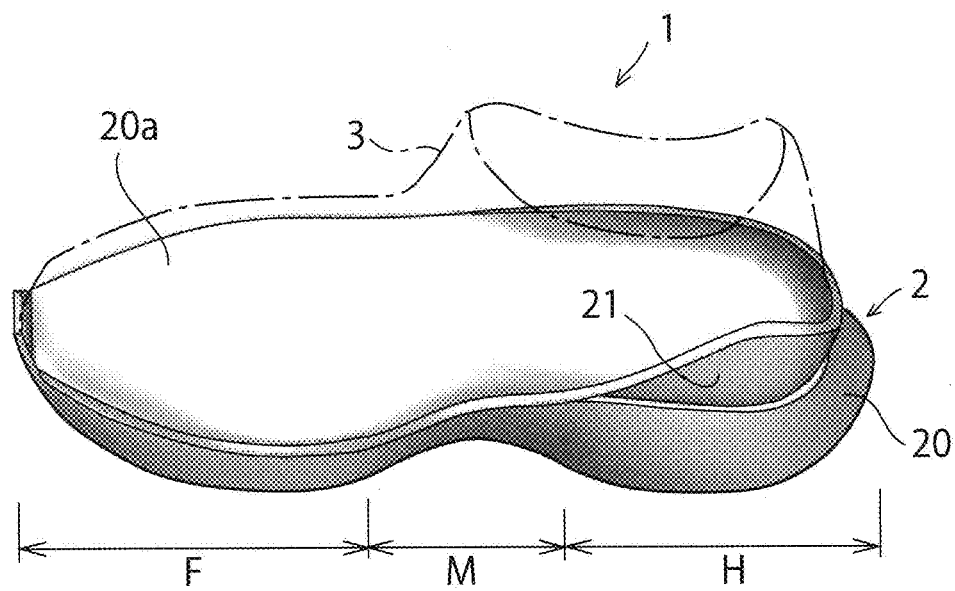
FIG. 2 is a general top perspective lateral-side view of the sole structure of FIG. 1.
Figure 3:
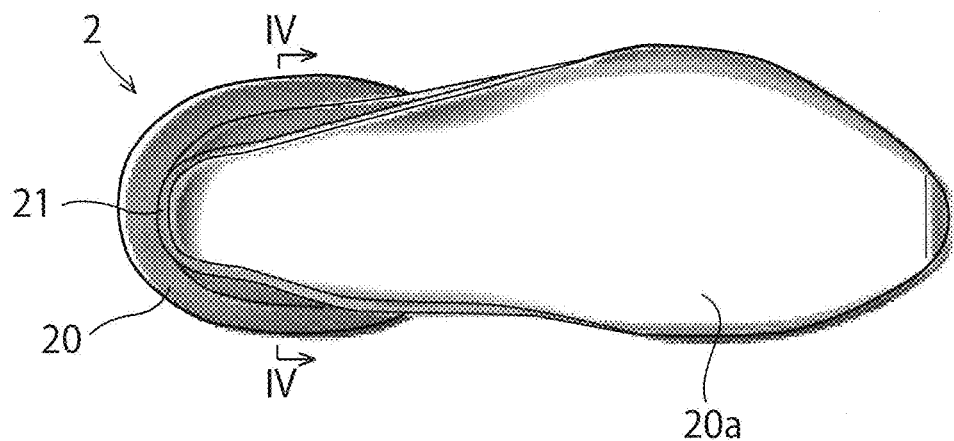
FIG. 3 is a top plan view of the sole structure of FIG. 1.

As shown in FIGS. 1 to 3, a shoe 1 comprises a sole structure 2 that extends along the entire length of the shoe 1 and an upper 3 (indicated by a dash-and-dot line) that is provided on the sole structure 2 and that is adapted to cover a foot of a shoe wearer (not shown).

The sole structure 2 includes a sole body 20 having a heel region H, a midfoot region M, and a forefoot region F that are configured and adapted to correspond to a heel portion, a midfoot portion or a plantar arch portion, and a forefoot portion of the foot, respectively. The sole body 20 has a foot-sole-contact surface 20a on a top surface thereof that comes into contact with a foot sole of the wearer directly or indirectly through an insole or a sock liner (not shown). The foot-sole-contact surface 20a is preferably a curved surface that gently curves in a longitudinal direction so as to follow the shape of the foot sole of the wearer.

The sole body 20 has a heel counter 21 provided mainly at the heel region H of the sole structure 2, which is disposed on an upper side of the sole body 20 and extends along the perimeter of the heel region H. The heel counter 21 is an upraised portion that extends upwardly from the foot-sole-contact surface 20a of the sole body 20 to encompass and support the perimeter of the heel portion of the foot. The shoe 1 is manufactured by fixedly attaching the bottom portion of the upper 3 with the foot-sole-contact surface 20a and the heel counter 21 though bonding or the like.

Figure 4:
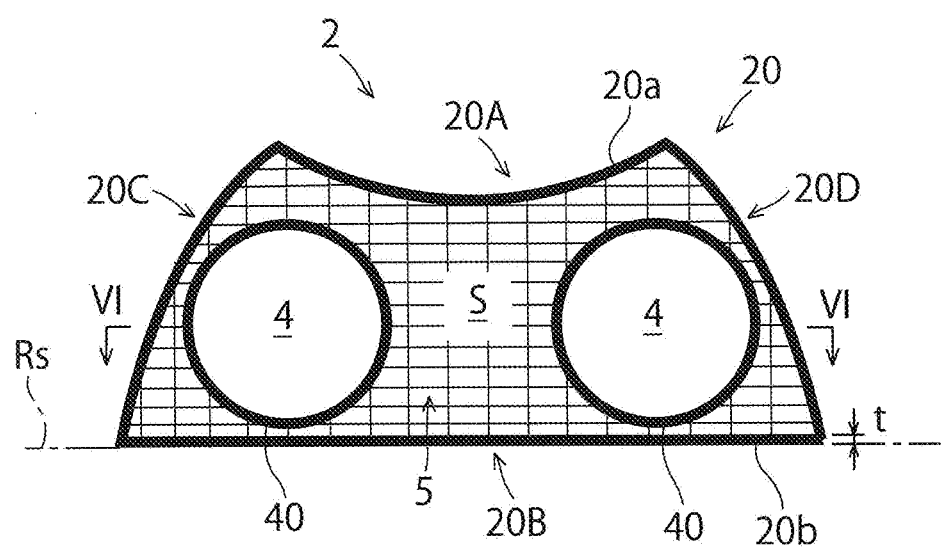
FIG. 4 is a cross sectional schematic view of FIG. 3 taken along line IV-IV, illustrating a cross sectional schematic view of a heel region of the sole structure.

As shown in FIG. 4 (or a cross sectional view of FIG. 3 taken along line IV-IV), i.e. a cross sectional view of the heel region H, the sole body 20 comprises an upper wall portion 20A disposed on an upper side of the sole structure 2, a lower wall portion 20B disposed below and away from the upper wall portion 20A, and a pair of sidewall portions 20C, 20D that are disposed between the upper wall portion 20A and the lower wall portion 20B, that extend substantially in the vertical direction to connect between the upper wall portion 20A and the lower wall portion 20B, and that are elastically deformable in the vertical direction. In FIG. 4, the heel counter 21 is not shown. A top surface of the upper wall portion 20A has, for example, a concavely curved surface to constitute the foot-sole-contact surface 20a, and a bottom surface of the lower wall portion 20B has a ground-contact surface 20b to be adapted to come into contact with the ground. The sidewall portions 20C, 20D have a convexly curved surface respectively that protrudes sideways outwardly.

The upper and lower wall portions 20A, 20B and the sidewall portions 20C, 20D have a predetermined thickness t, respectively. Thickness t is preferably set at 1 mm or more to 3 mm or less. In FIG. 4, each of the wall portions 20A, 20B, 20C, 20D is indicated by a thick line for illustration purposes and a hatching for showing a cross section is omitted. The upper and lower wall portions 20A, 20B and the sidewall portions 20C, 20D are resin-made wall-shaped members to constitute the sole body 20 as a box-shaped member (that is, the sole body 20 has a box structure/outer shell structure). The sole body 20 has an interior region S formed inside the sole body 20 and surrounded by these wall portions 20A, 20B, 20C, 20D. As resin to constitute the sole body 20, for example, thermoplastic resin such as nylon, polyester, TPU (thermoplastic polyurethane), PU (polyurethane) or the like, and rubber or the like may be used.

In the interior region S, a hollow portion 4 is provided. That is, the hollow portion 4 is disposed inside the boxed-shaped sole body 20. In the illustrated example, the hollow portion 4 has a circular or round section formed by a partition wall 40, or a resin-made wall-shaped member, with a predetermined thickness t, as with the upper and lower wall portions 20A, 20B and the sidewall portions 20C, 20D. Here, the thickness of the partition wall 40 is designated using the same reference character t as the thickness of the upper and lower wall portions 20A, 20B and the sidewall portions 20C, 20D for convenience of illustration and explanation, but these thicknesses t are not necessarily the same. Also, in the interior region S, a three-dimensional elastic fiber structure 5 formed of resin fibers is provided around the hollow portion 4. The hollow portion 4 is in contact with the three-dimensional elastic fiber structure 5 through the partition wall 40. That is, in the interior region S, at an area except for the hollow portion 4 and the partition wall 40, the three-dimensional elastic fiber structure 5 is filled.

Figure 5:
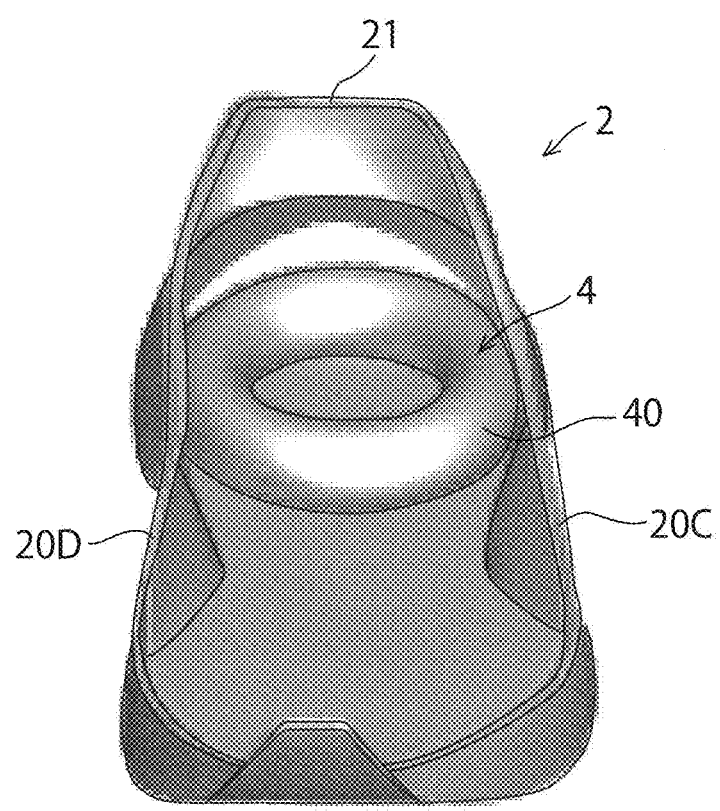
FIG. 5 is a general top perspective frontside view of the sole structure of FIG. 1, illustrating a hollow portion inside the sole structure by removing the upper wall portion and the three-dimensional elastic fiber structure of the sole structure.
Figure 6:
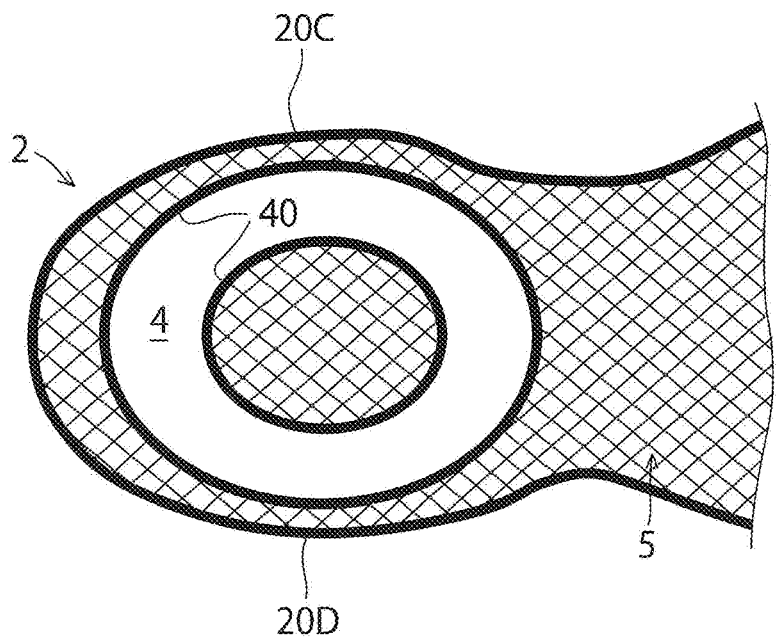
FIG. 6 is a longitudinal sectional view of the heel region of the sole structure of FIG. 1 along the horizontal plane, corresponding to a section of FIG. 4 taken along line IV-IV.

As shown in FIG. 5, or a perspective view, in which the upper wall portion 20A and the three-dimensional elastic fiber structure 5 are removed from the sole structure 2 to indicate an external appearance of the hollow portion 4, and also shown in FIG. 6, or a longitudinal sectional view of the sole structure 2 along the horizontal plane (i.e. a longitudinal sectional view of FIG. 4 taken along line VI-VI), the hollow portion 4 has a hollow donut-shape, that is, an endless tube-shape formed of the partition wall 40.

Figure 7:
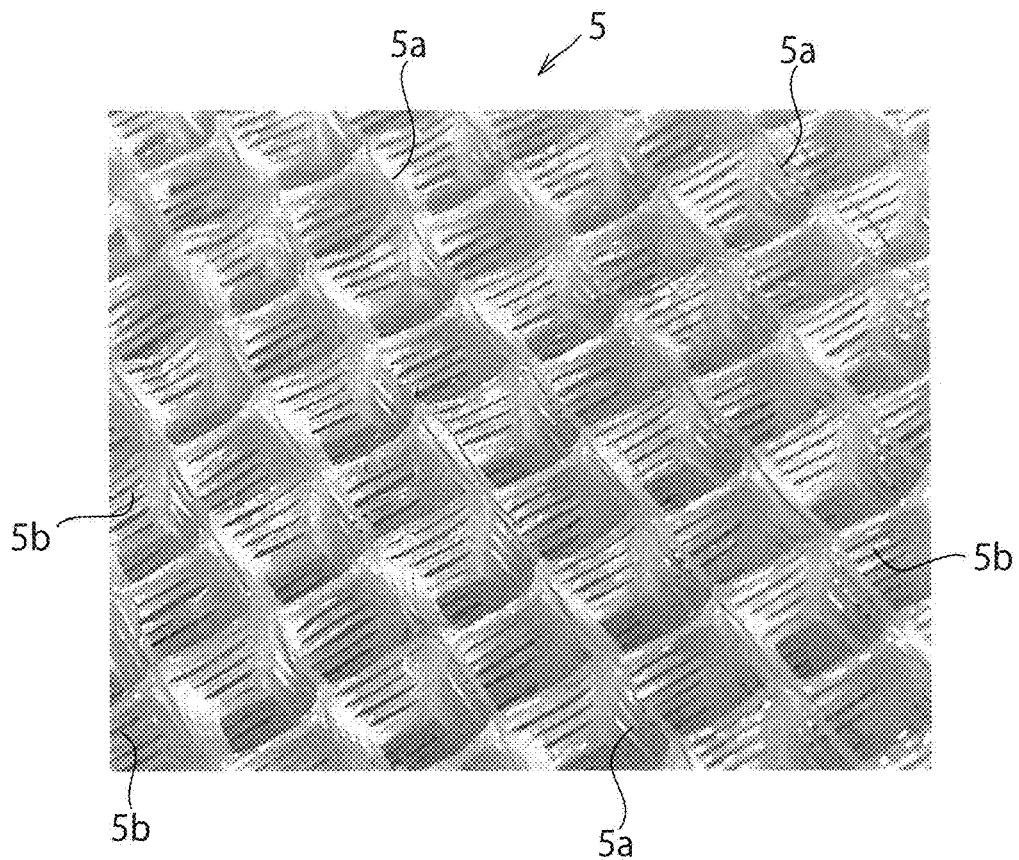
FIG. 7 is a partial perspective view of the three-dimensional elastic fiber structure formed of resin fibers constituting the sole structure of FIG. 1, viewed from diagonally above.

As shown in FIG. 7, the three-dimensional elastic fiber structure 5 is a filament structure in which a number of unidirectionally extending resin filaments 5a are arranged along a first direction and spaced apart in parallel on a horizontal plane and a number of unidirectionally extending resin filaments 5b intersecting with (e.g. extending generally perpendicular to) the resin filaments 5a are arranged along a second direction and spaced apart in parallel on the horizontal plane to form one resin layer on the horizontal plane, and such a resin layer is then overlayed in the vertical direction to form a multiple of resin layers. As the resin filaments 5a, 5b, for example, a fiber of 0.3-0.5 mm in diameter may be used. Between the adjacent resin layers in the vertical direction, there is formed a small gap.

As above-mentioned, in the three-dimensional elastic fiber structure 5, fine resin filaments extend at predetermined intervals in the first direction as well as in the second direction to form each of the layers on the horizontal plane, and the respective layers are interconnected with one another in the vertical direction, such that thereby a three-dimensional filament structure is constructed. Therefore, such a three-dimensional filament structure can exhibit an excellent elasticity not only in the longitudinal, lateral and vertical directions but also in every direction. Moreover, according to such a three-dimensional filament structure, a remarkable weight saving is possible compared with materials such as conventional EVA, rubber and the like.

The three-dimensional elastic fiber structure 5 is preferably molded (or formed/3D-printed) by additive manufacturing, preferably through a 3D printer. As such a 3D printer, FDM (Fused Deposition Modeling)—method type is preferably used. This method may utilize thermoplastic resin such as nylon, polyester, TPU (thermo plastic polyurethane), PU (polyurethane), thermoplastic elastomer and the like, or rubber and the like. A soft material is preferable and a soft material having the Asker A hardness of 90A or below is more preferable. In this case, the three-dimensional elastic fiber structure 5 becomes a soft filament structure.

When molding the three-dimensional elastic fiber structure 5 by the 3D printer, the upper and lower wall portions 20A, 20B and the sidewall portions 20C, 20D composing the sole body 20, and the partition wall 40 forming the hollow portion 4 are simultaneously molded by the 3D printer. That is, the sole body 20 and the hollow portion 4 are formed integrally with the three-dimensional elastic fiber structure 5.

Therefore, at the time of molding the sole body 20 composed of the upper and lower wall portions 20A, 20B and the sidewall portions 20C, 20D, the three-dimensional elastic fiber structure 5 and the hollow portion 4 to be disposed inside the sole body 20 is integrally formed with the sole body 20 (i.e. simultaneously printed with the sole body 20), thereby eliminating a working process for disposing the three-dimensional elastic fiber structure 5 and the hollow portion 4 in the interior region S of the sole body 20 to fixedly attach the three-dimensional elastic fiber structure 5 and the hollow portion 4 to the sole body 20 thus reducing a manufacturing cost. Preferably, at the time of molding the sole body 20, the heel counter 21 is also integrally formed with the sole body 20 (i.e. simultaneously printed with the sole body 20), such that thereby molding the sole structure 2 at a time by the additive manufacturing through the 3D printer, thus simplifying the manufacturing process and further reducing the manufacturing cost. Moreover, at the time of molding the sole body 20, if molding is conducted based on foot information such as three-dimensional foot data (e.g. foot length, foot width, arch height, foot sole shape, etc.), foot pressure distribution and the like acquired from individual shoe wearers, personal-fit soles are achieved that are customized to fit the feet of the individual shoe wearers.

Regarding a compressive hardness, or elasticity, of the three-dimensional elastic fiber structure, the degree of hardness or softness may be determined according to filling density of resin to be filled inside the sole body 20 and hardness of the wall-shaped member to compose the upper and lower wall portions 20A, 20B and the sidewall portions 20C, 20D of the sole body 20.

For example, by decreasing the filling density of resin (e.g. approximately 5-10%), or softening the wall-shaped member, the sole body 20 may be softened. In the event that the sole body 20 is made too soft, addition of the hollow portion 4 can adjust the sole body 20 in a moderate softness due to elastic repulsion generated at the time of deformation of the hollow portion 4, or excessive-deformation resistance imparted by the partition wall 40 of the hollow portion 4.

Alternatively, by increasing the filling density of resin (e.g. approximately 15-20%), or hardening the wall-shaped member, the sole body 20 may be hardened. In the event that the sole body 20 is made too hard, enlarging the volume of the hollow portion 4 or thinning of the partition wall 40 of the hollow portion 4 can make the hollow portion 4 easy to deform, thus adjusting the sole body 20 in a moderate hardness.

Additionally, when the sole body 20 is made partially hard/soft according to compressive hardness of the three-dimensional elastic fiber structure 5, the hollow portion 4 may be disposed at a desired position. Also, when weight saving of the sole body 20 is valued, the hollow portion 4 may be disposed at a position of less influence relative to deformation of the sole body 20 in loading.

In the above-mentioned sole structure 2, at the time of impacting the ground, the sidewall portions 20C, 20D of the sole body 20 elastically deform in the vertical direction and the three-dimensional elastic fiber structure 5 elastically deforms in the interior region S, thereby exhibiting cushioning property to achieve soft landing. Also, since the sidewall portions 20C, 20D are connected to the upper and lower wall portions 20A, 20B, at the time of elastic deformation of the sidewall portions 20C, 20D, the upper and lower wall portions 20A, 20B restrain compressive deformation of the sole body 20, thus improving landing stability.

Moreover, in the interior region S, since the hollow portion 4 is provided in contact with the three-dimensional elastic fiber structure 5, elastic deformation of the three-dimensional elastic fiber structure 5 can be controlled by the action of elastic repulsion resulting from elastic compressive deformation of the hollow portion 4, thereby controlling cushioning property and stability of the sole structure 2.

Figure 8:
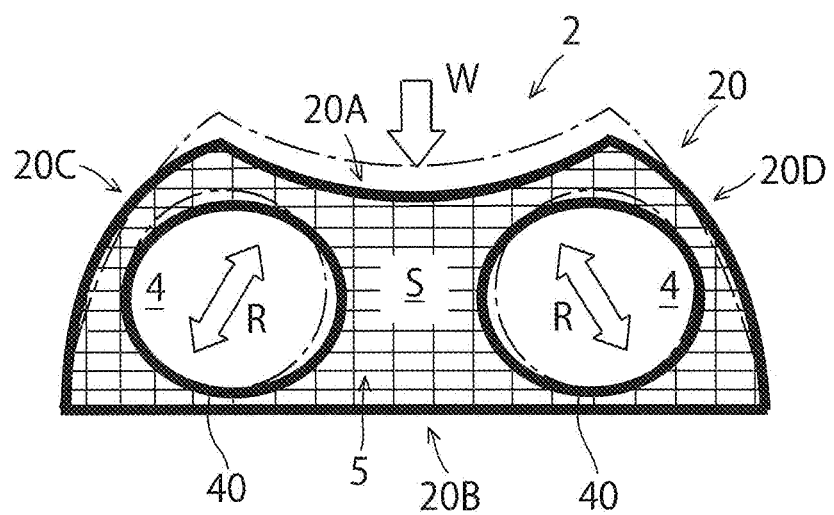
FIG. 8 shows a state in which an excessive compressive load is applied to the sole structure of FIG. 4.

FIG. 8 shows the state when an excessive compressive load W acts onto the sole structure 2 at the time of mechanical compression such as landing or shoemaking. In the drawing, a solid line illustrates the state after deformation, and a dash-and-dot line illustrates the state before deformation. By the action of the excessive compressive load W, when the upper wall portion 20A of the sole body 20 is about to deform to sink largely downwardly and the sidewall portions 20C, 20D are about to deform to swell out largely sideways, a compressive force is imparted to the hollow portion 4 in the interior region S of the sole body 20. At this time, since the hollow portion 4 is an air-tight space, an elastic repulsion R is generated inside the hollow portion 4 against the compressive force. Also, since the partition wall 40 of the hollow portion 4 is composed of the wall-shaped member, the wall-shaped member restrains deformation of the hollow portion 4, such that thereby a compressive deformation of the hollow portion 4 can be restricted.

As a result, when the excessive compressive load W is applied to the sole structure 2 to excessively compress the sole structure 2, the above-mentioned function of the hollow portion 4 can prevent an excessive deformation such that the upper wall portion 20A deforms to sink largely downwardly and the sidewall portions 20C, 20D deform to swell out largely sideways, thereby enhancing an excessive-deformation resistance of the sole structure 2.

Also, since the hollow portion 4 has a donut-shape and is disposed along the perimeter of the heel region H of the sole structure 2 (see FIG. 6), at the time of a heel impact onto the ground, the hollow portion 4 generates an elastic resilience at the heel rear end side as well as the medial and lateral sides. Therefore, when the shoe wearer impacts the ground at any position of the heel region H, cushioning property and the stability of the sole structure 2 can be controlled.

Moreover, the excessive-deformation resistance of the sole structure 2 can be achieved at any position of the heel region H.

Figure 9:
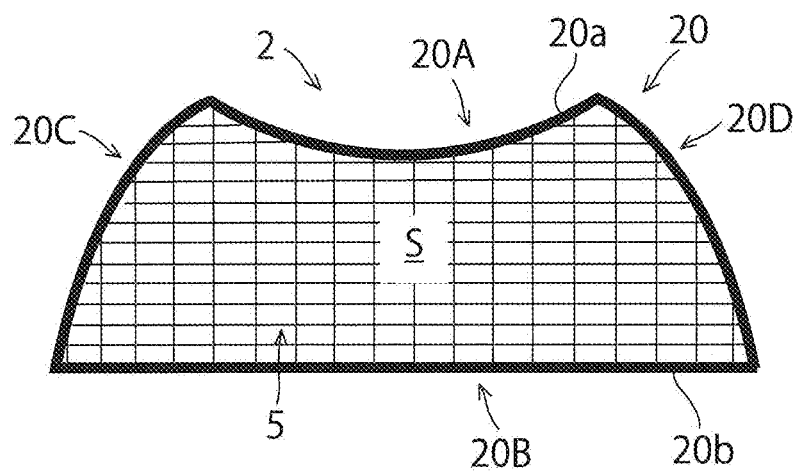
FIG. 9 is a cross sectional schematic view of a heel region of a sole structure without a hollow portion, corresponding to FIG. 4.
Figure 10:
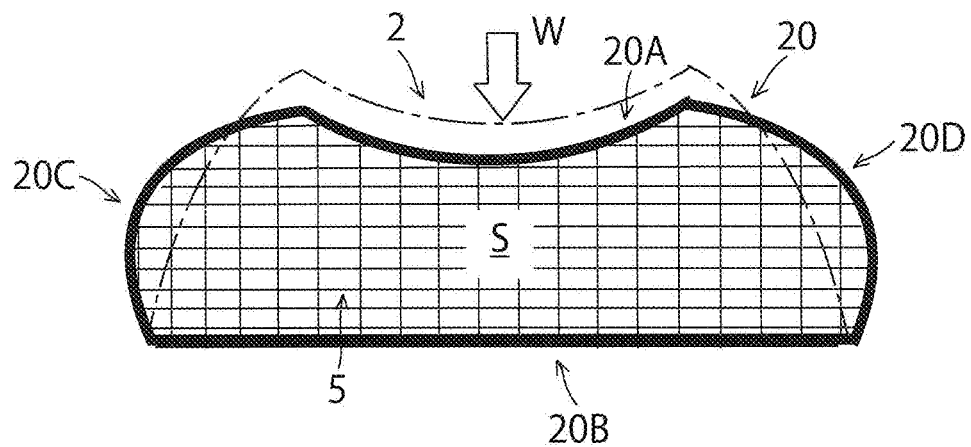
FIG. 10 shows a state in which an excessive compressive load is applied to the sole structure of FIG. 9, corresponding to FIG. 8.

Here, for comparison with the present embodiment, FIGS. 9 and 10 show an example in which the sole structure 2 has no hollow portion 4. FIG. 9 shows the state before deformation that corresponds to FIG. 4, and FIG. 10 shows the state after deformation that corresponds to FIG. 8.

In this case, since the sole structure 2 has no hollow portion to restrain compressive deformation of the sole structure 2, when an excessive compressive load W is applied to the sole structure 2, as shown in FIG. 10, the upper wall portion 20A deforms to sink largely downwardly and the sidewall portions 20C, 20D deform to swell out largely sideways, thus causing an excessive deformation.

Additionally, in the above-mentioned embodiment, an example was shown in which the hollow portion 4 has a donut-shape, but the shape of the hollow portion 4 is not restricted to such an example and the hollow portion 4 may employ various shapes. Also, the disposition, the direction, the size, and the number of the hollow portion may adopt various patterns. The following first to seventh alternative embodiments respectively show examples of such patterns.

First Alternative Embodiment

Figure 11:
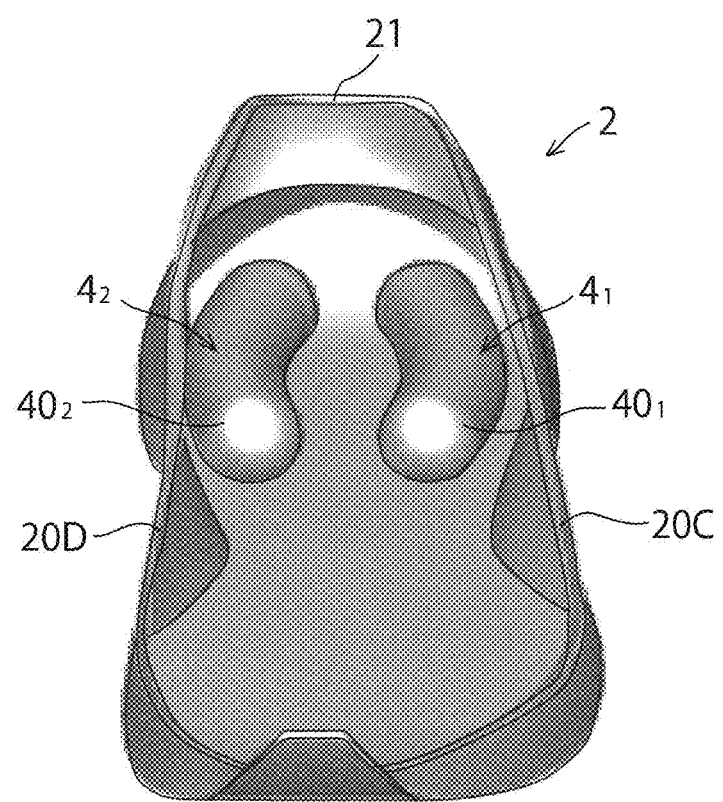
FIG. 11 is a general top perspective frontside view of the sole structure according to a first alternative embodiment of the present invention, illustrating a hollow portion inside the sole structure by removing the upper wall portion and the three-dimensional elastic fiber structure of the sole structure, corresponding to FIG. 5.
Figure 12:
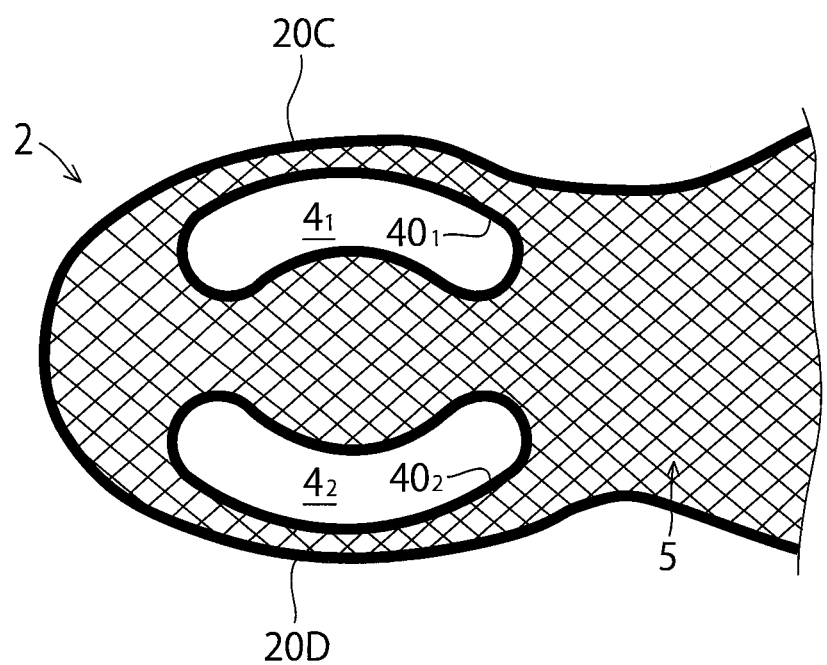
FIG. 12 is a longitudinal sectional view of the heel region of the sole structure of FIG. 11 along the horizontal plane, corresponding to FIG. 6.

FIGS. 11 and 12 show a sole structure according to a first alternative embodiment of the present invention. In these drawings, like reference numbers indicate identical or functionally similar elements to those in the above-mentioned embodiment shown in FIGS. 1 to 10. FIG. 11 corresponds to FIG. 5 of the above-mentioned embodiment and FIG. 12 corresponds to FIG. 6 of the above-mentioned embodiment. That is, FIG. 11 is a perspective view illustrating an external appearance of the hollow portion in the state that the upper wall portion and the three-dimensional elastic fiber structure are removed from the sole structure. FIG. 12 is a longitudinal sectional view along the horizontal plane of the sole structure.

As shown in FIGS. 11 and 12, in this first alternative embodiment, as a hollow portion, a pair of hollow portions $4_1$, $4_2$ are provided on opposite sides of the sole structure 2. The hollow portion $4_1$ extends arcuately in the substantially longitudinal direction along the sidewall portion 20C of the sole body 20 and has a tube-shape composed of a partition wall $40_1$. Likewise, the hollow portion $4_2$ extends arcuately in the substantially longitudinal direction along the sidewall portion 20D of the sole body 20 and has a tube-shape composed of a partition wall $40_2$. The cross sectional view of the heel region of the sole structure 2 along the hollow portions $4_1$, $4_2$ is similar to FIG. 4 of the above-mentioned embodiment, and the shape of the cross section of the hollow portions $4_1$, $4_2$ is circular or round.

In this first alternative embodiment as well, similar to the above-mentioned embodiment, at the time of impacting the ground, the sidewall portions 2C, 2D and the three-dimensional elastic fiber structure 5 of the sole body 20 elastically deform, thereby exhibiting cushioning property and improving landing stability. At the same time, by the action of elastic repulsion resulting from elastic compressive deformation of the hollow portion $4_1$, $4_2$ in contact with the three-dimensional elastic fiber structure 5, an elastic deformation of the three-dimensional elastic fiber structure 5 can be controlled, thereby controlling cushioning property and landing stability of the sole structure 2. Moreover, when an excessive compressive load is applied at the time of mechanical compression such as landing or shoemaking, not only an elastic repulsion resulting from an elastic compressive deformation of the hollow portions $4_1$, $4_2$ is generated inside the hollow portions $4_1$, $4_2$ against the compressive load but also the wall-shaped member composing the partition walls $40_1$, $40_2$ of the hollow portions $4_1$, $4_2$ restrains deformation of the hollow portion 4, such that thereby an excessive compressive deformation of the hollow portions $4_1$, $4_2$ can be restricted. As a result, an excessive deformation of the sole structure 2 can be prevented, thereby enhancing an excessive-deformation resistance of the sole structure 2.

In addition, the disposition or direction of the hollow portions $4_1$, $4_2$ are not restricted to that shown in FIG. 11. Also, only either one of the hollow portions $4_1$, $4_2$ may be provided.

Second Alternative Embodiment

Figure 13:
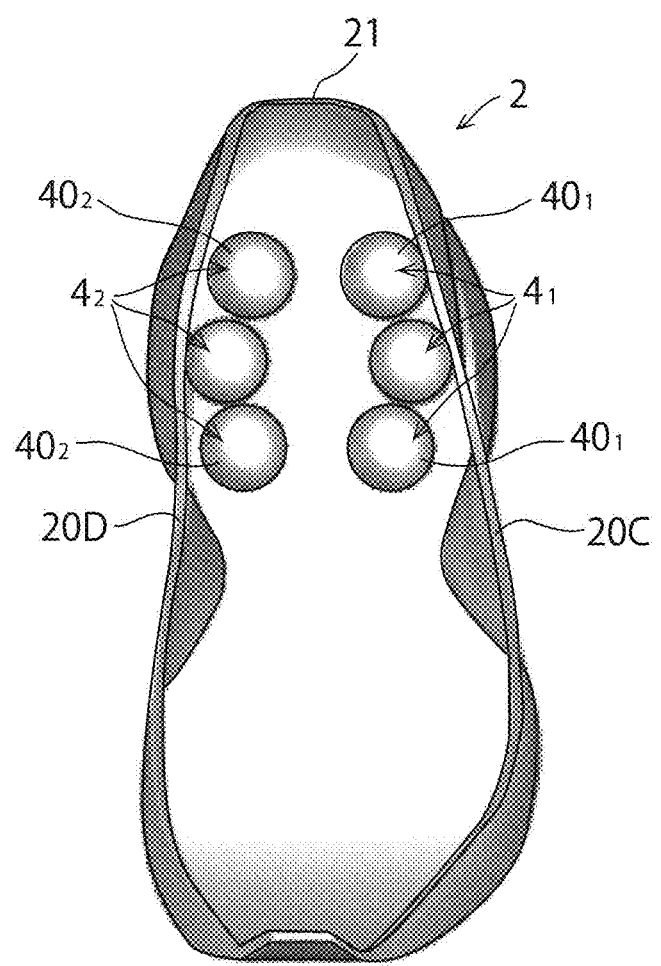
FIG. 13 is a general perspective frontside view of the sole structure according to a second alternative embodiment of the present invention, illustrating a hollow portion inside the sole structure by removing the upper wall portion and the three-dimensional elastic fiber structure of the sole structure, corresponding to FIG. 5.
Figure 14:
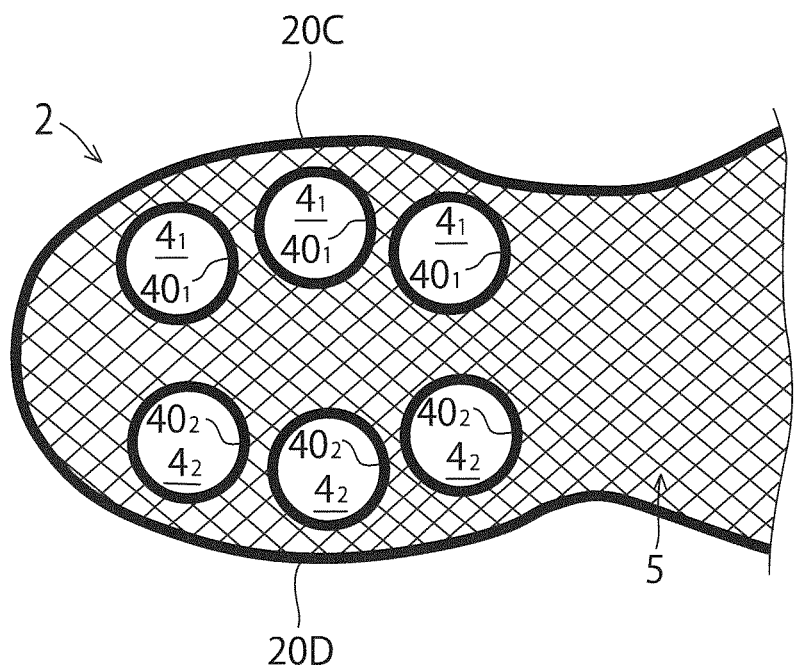
FIG. 14 is a longitudinal sectional view of the heel region of the sole structure of FIG. 13 along the horizontal plane, corresponding to FIG. 6.

FIGS. 13 and 14 show a sole structure according to a second alternative embodiment of the present invention. In these drawings, like reference numbers indicate identical or functionally similar elements to those in the above-mentioned embodiment shown in FIGS. 1 to 10. FIG. 13 corresponds to FIG. 5 of the above-mentioned embodiment and FIG. 14 corresponds to FIG. 6 of the above-mentioned embodiment. That is, FIG. 13 is a perspective view illustrating an external appearance of the hollow portion in the state that the upper wall portion and the three-dimensional elastic fiber structure are removed from the sole structure. FIG. 14 is a longitudinal sectional view along the horizontal plane of the sole structure.

As shown in FIGS. 13 and 14, in this second alternative embodiment, as a hollow portion, a plurality of spherical hollow portions $4_1$, $4_2$ are provided. The hollow portions $4_1$ are disposed along the sidewall portion 20C of the sole body 20, composed of three hollow portions $4_1$ in the illustrated example that are spaced apart from one another, and each of the hollow portions $4_1$ has a void encompassed by the round partition wall $40_1$. Similarly, the hollow portions $4_2$ are disposed along the sidewall portion 20D of the sole body 20, composed of three hollow portions $4_2$ in the illustrated example that are spaced apart from one another, and each of the hollow portions $4_2$ has a void encompassed by the round partition wall $40_2$. The cross sectional view of the heel region of the sole structure 2 along the hollow portions $4_1$, $4_2$ is similar to FIG. 4 and the cross sectional shape of the hollow portions $4_1$, $4_2$ is circular or round.

In this second alternative embodiment as well, similar to the above-mentioned embodiment, at the time of impacting the ground, the sidewall portions 2C, 2D and the three-dimensional elastic fiber structure 5 of the sole body 20 elastically deform, thereby exhibiting cushioning property and improving landing stability. At the same time, by the action of elastic repulsion resulting from elastic compressive deformation of the hollow portions $4_1$, $4_2$ in contact with the three-dimensional elastic fiber structure 5, an elastic deformation of the three-dimensional elastic fiber structure 5 can be controlled, thereby controlling cushioning property and landing stability of the sole structure 2. Moreover, when an excessive compressive load is applied at the time of mechanical compression such as landing or shoemaking, not only an elastic repulsion resulting from an elastic compressive deformation of the hollow portions $4_1$, $4_2$ is generated inside the hollow portions $4_1$, $4_2$ against the compressive load but also the wall-shaped member composing the partition wall $40_1$, $40_2$ of the hollow portions $4_1$, $4_2$ restrains deformation of the hollow portion $4_1$, $4_2$, such that thereby an excessive compressive deformation of the hollow portions $4_1$, $4_2$ can be restricted. As a result, an excessive deformation of the sole structure 2 can be prevented, thereby enhancing an excessive-deformation resistance of the sole structure 2.

In addition, the disposition or direction of the hollow portions $4_1$, $4_2$ are not restricted to that shown in FIG. 14. Also, only either one of the hollow portions $4_1$, $4_2$ may be provided.

Third Alternative Embodiment

Figure 15:
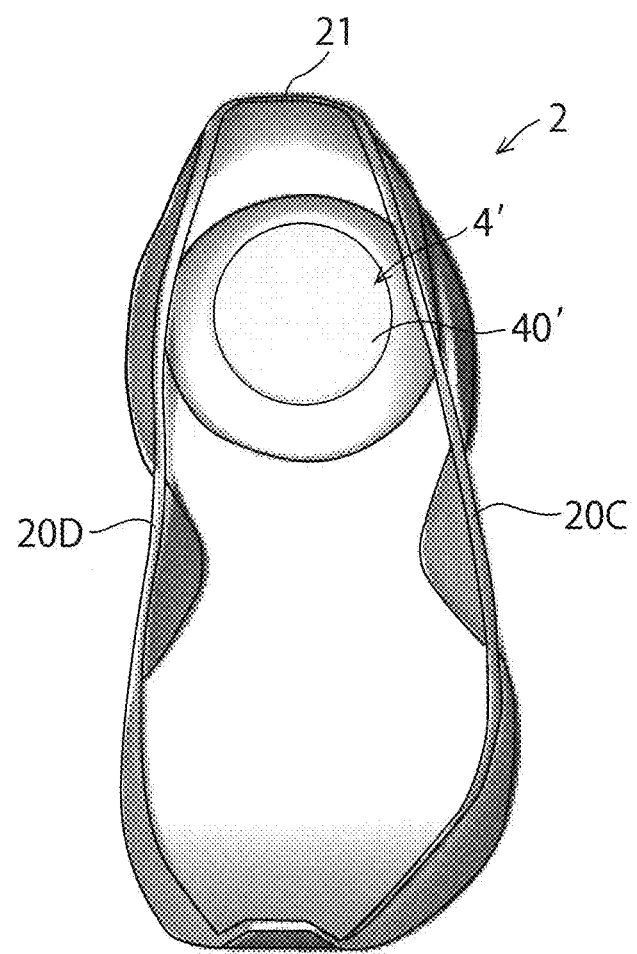
FIG. 15 is a general perspective frontside view of the sole structure according to a third alternative embodiment of the present invention, illustrating a hollow portion inside the sole structure by removing the upper wall portion and the three-dimensional elastic fiber structure of the sole structure, corresponding to FIG. 5.
Figure 16:
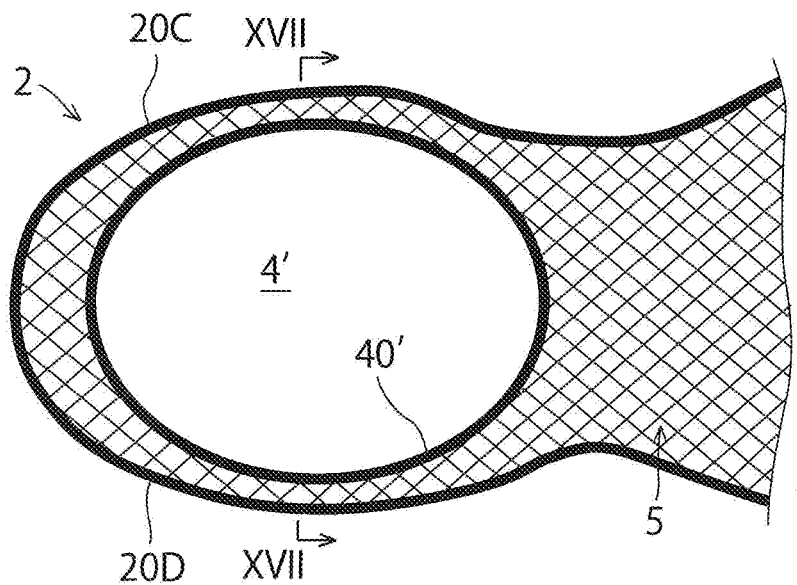
FIG. 16 is a longitudinal sectional view of the heel region of the sole structure of FIG. 15 along the horizontal plane, corresponding to FIG. 6.
Figure 17:
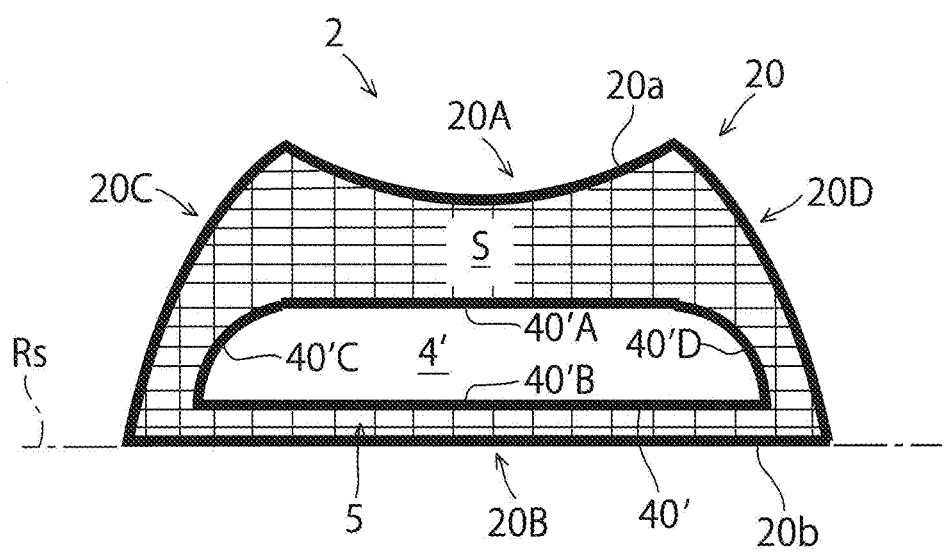
FIG. 17 is a cross sectional view of the heel region of the sole structure of FIG. 15, corresponding to a section of FIG. 16 taken along line XVII-XVII.

FIGS. 15 to 17 show a sole structure according to a third alternative embodiment of the present invention. In these drawings, like reference numbers indicate identical or functionally similar elements to those in the above-mentioned embodiment shown in FIGS. 1 to 10. FIG. 15 corresponds to FIG. 5, FIG. 16 corresponds to FIG. 6, and FIG. 17 corresponds to FIG. 3 of the above-mentioned embodiment, respectively. That is, FIG. 15 is a perspective view illustrating an external appearance of the hollow portion in the state that the upper wall portion and the three-dimensional elastic fiber structure are removed from the sole structure. FIG. 16 is a longitudinal sectional view along the horizontal plane of the sole structure. FIG. 17 is a cross sectional view of the heel region of the sole structure.

As shown in FIGS. 15 to 17, in this third alternative embodiment, as a hollow portion, a hollow portion 4' having a flat bowl-shape or dome-shape, alternatively saucer-shape in cross section is provided. The hollow portion 4' has a void encompassed by the partition wall 40' and is disposed at the generally entire heel region H of the sole structure 2.

In this third alternative embodiment as well, similar to the above-mentioned embodiment, at the time of impacting the ground, the sidewall portions 2C, 2D and the three-dimensional elastic fiber structure 5 of the sole body 20 elastically deform, thereby exhibiting cushioning property and improving landing stability. At the same time, by the action of elastic repulsion resulting from elastic compressive deformation of the hollow portions 4' in contact with the three-dimensional elastic fiber structure 5, an elastic deformation of the three-dimensional elastic fiber structure 5 can be controlled, thereby controlling cushioning property and landing stability of the sole structure 2. Moreover, when an excessive compressive load is applied at the time of mechanical compression such as landing or shoemaking, not only an elastic repulsion resulting from an elastic compressive deformation of the hollow portion 4' is generated inside the hollow portion 4' against the compressive load but also the wall-shaped member composing the partition wall 40' of the hollow portion 4' restrains deformation of the hollow portion 4', such that thereby an excessive compressive deformation of the hollow portion 4' can be restricted. As a result, an excessive deformation of the sole structure 2 can be prevented, thereby enhancing an excessive-deformation resistance of the sole structure 2.

In this case, regarding the inner wall surfaces of the partition wall 40' of the hollow portion 4', the top surface 40'A and the bottom surface 40'B are respectively formed of a planar surface, and the side surfaces 40'C, 40'D are respectively formed of a circular or round surface (see FIG. 17). In contrast, in the above-mentioned embodiment and first to second alternative embodiments, the inner wall surface of the partition wall 40 of the hollow portion 4 and the partition walls $40_1$, $40_2$ of the hollow portions $4_1$, $4_2$ are respectively formed of a circular surface (see FIG. 4). In addition, the top surface 40'A of the inner wall surface of the partition wall 40' of the hollow portion 4' may be formed of a curved surface of an upwardly convex shape.

Fourth Alternative Embodiment

Figure 18:
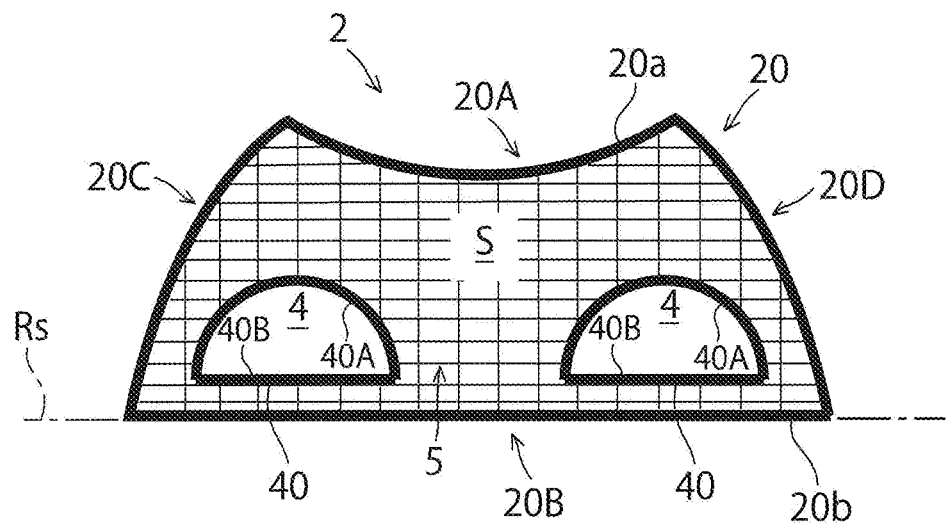
FIG. 18 is a cross sectional view of the heel region of the sole structure according to the fourth alternative embodiment of the present invention, corresponding to FIG. 4.

FIG. 18 shows a sole structure according to a fourth alternative embodiment of the present invention, which corresponds to FIG. 4 of the above-mentioned embodiment. In FIG. 18, like reference numbers indicate identical or functionally similar elements to those in the above-mentioned embodiment shown in FIGS. 1 to 10. As shown in FIG. 18, in this fourth alternative embodiment, the cross sectional shape of the hollow portion 4 is semi-circular, in which the top surface 40A of the inner wall surface of the partition wall 40 of the hollow portion 4 is formed of a circular shape and the bottom surface 40B of the inner wall surface of the partition wall 40 of the hollow portion 4 is formed of a planar shape.

Fifth Alternative Embodiment

Figure 19:
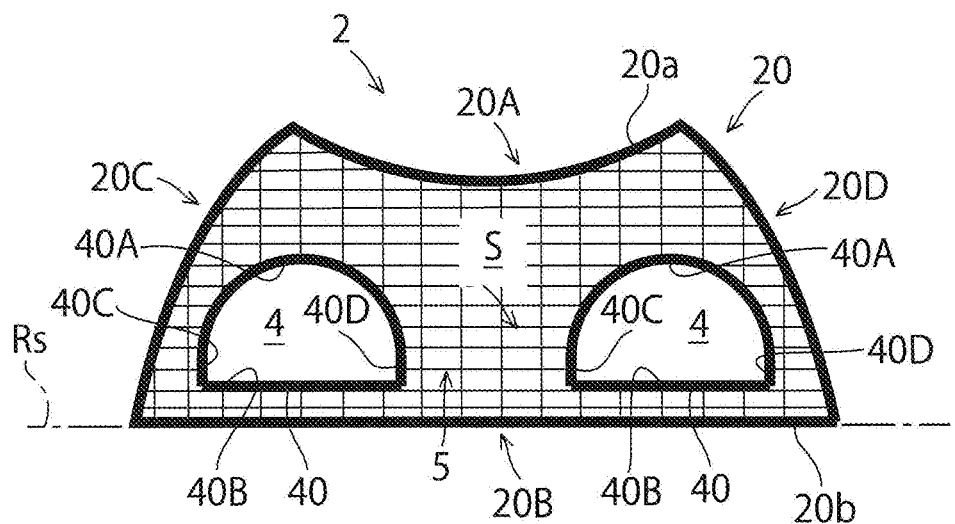
FIG. 19 is a cross sectional view of the heel region of the sole structure according to the fifth alternative embodiment of the present invention, corresponding to FIG. 4.

FIG. 19 shows a sole structure according to a fifth alternative embodiment of the present invention, which corresponds to FIG. 4 of the above-mentioned embodiment. In FIG. 19, like reference numbers indicate identical or functionally similar elements to those in the above-mentioned embodiment shown in FIGS. 1 to 10. As shown in FIG. 19, in this fifth alternative embodiment, the cross sectional shape of the hollow portion 4 is generally semi-circular. The top surface 40A of the inner wall surface of the partition wall 40 of the hollow portion 4 is formed of a circular or curved shape, the bottom surface 40B of the inner wall surface of the partition wall 40 is formed of a planar shape, and the side surfaces 40C, 40D of the inner wall surface of the partition wall 40 connected between the top surface 40A and the bottom surface 40B are respectively formed of a planar shape.

Sixth Alternative Embodiment

FIG. 20 shows a sole structure according to a sixth alternative embodiment of the present invention, in which FIGS. 20A to 20E respectively illustrate an external shape of various variants of the hollow portion disposed inside the sole structure.

Figure 24:
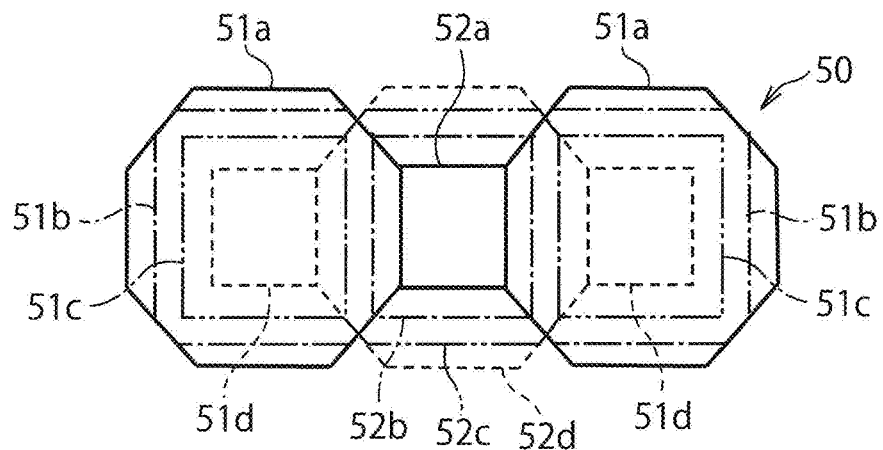
FIG. 24 is a top plan schematic view of a basic module constituting the three-dimensional elastic fiber structure of FIG. 23.
Figure 24A:
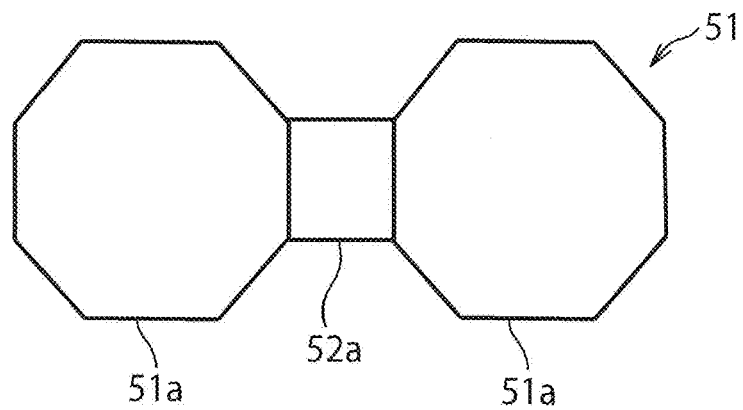
FIG. 24A is a top plan schematic view of a first pattern of the basic module that is arranged at a topmost layer (or a first layer) of the basic module of FIG. 24.
Figure 24B:
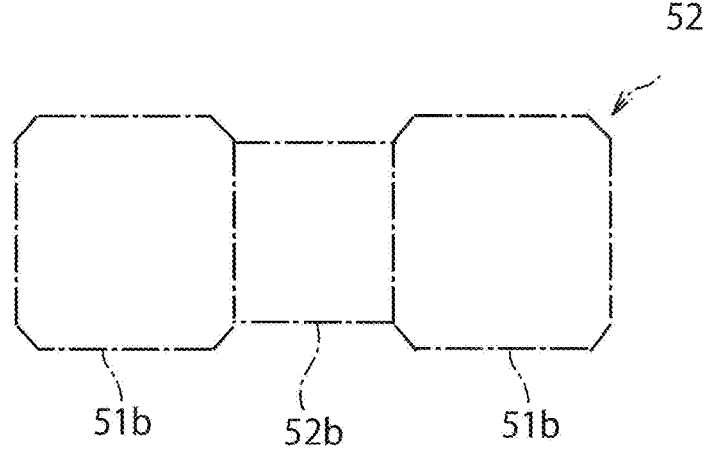
FIG. 24B is a top plan schematic view of a second pattern of the basic module that is arranged at a second layer immediately below the first layer of the basic module of FIG. 24.

The hollow portion 4 shown in FIG. 24A is formed of an upper partition wall 400 of a hemispherical shape or a dome-shape, and a lower partition wall 401 of a cylindrical shape that is coupled to the bottom part of the upper partition wall 400. The hollow portion 4 shown in FIG. 24A corresponds to the hollow portion 4 in the fifth alternative embodiment. In this sixth alternative embodiment, the axial length of the side surfaces 20C, 20D of the fifth alternative embodiment is elongated compared with the hollow portion 4 in the fifth alternative embodiment. The hollow portion 4 shown in FIG. 24B is formed of an upper partition wall 400' of a conical shape, and a lower partition wall 401 of a cylindrical shape that is coupled to the bottom part of the upper partition wall 400'. The inner wall surface of the upper partition wall 400' has a curved conical shape, which converges toward the apex 400'*p*.

Figure 20A:
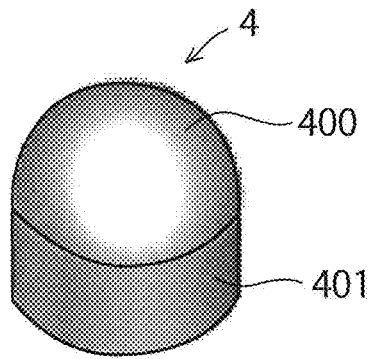
FIGS. 20A-20E illustrate the sole structure according to the sixth alternative embodiment of the present invention, respectively showing external shapes of various variants of the hollow portion that is disposed inside the sole structure.
Figure 20D:
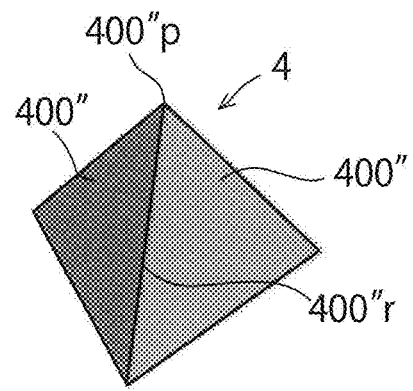
Figure 20B:
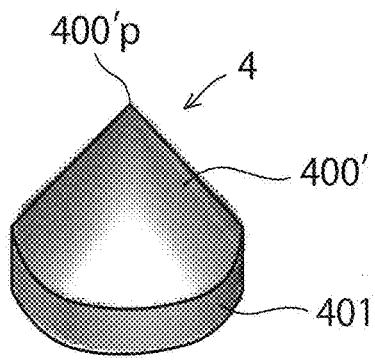
Figure 20E:
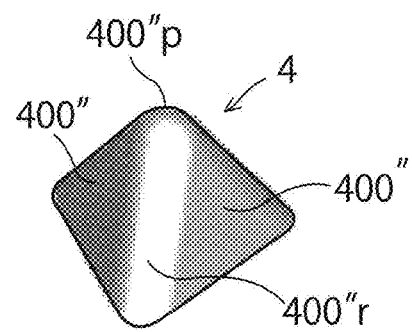
Figure 20C:
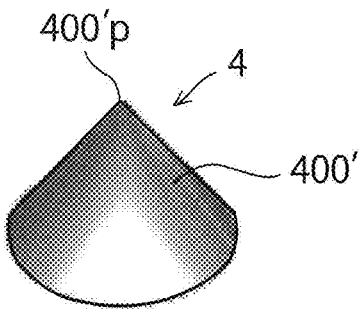
Figure 24C:
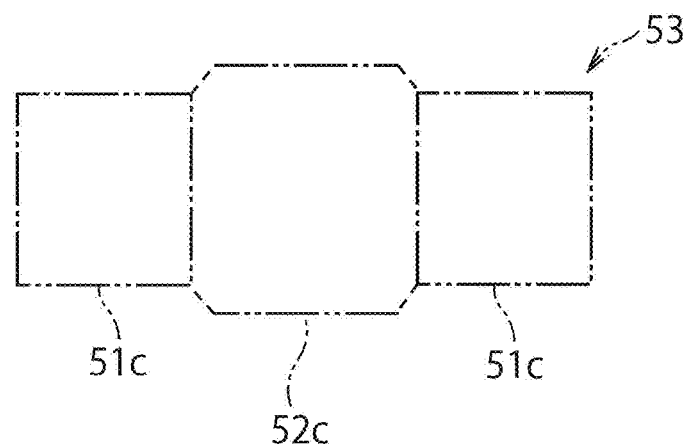
FIG. 24C is a top plan schematic view of a third pattern of the basic module that is arranged at a third layer immediately below the second layer of the basic module of FIG. 24.
Figure 24D:
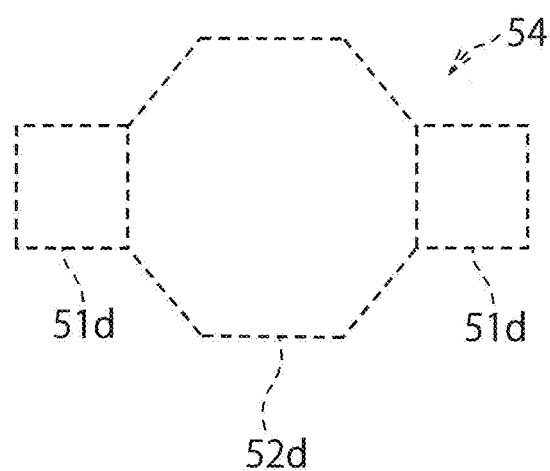
FIG. 24D is a top plan schematic view of a fourth pattern of the basic module that is arranged at a fourth layer immediately below the third layer of the basic module of FIG. 24.

The hollow portion 4 shown in FIG. 24C is formed of a partition wall 400' of a conical shape. The inner wall surface of the partition wall 400' has a curved conical shape, which converges toward the apex 400'*p*. The hollow portion 4 shown in FIG. 24D is formed of a partition wall 400" of a pyramidal shape (in the illustrated example, a trigonal pyramidal shape). The inner wall surface of the partition wall 400" has a pyramidal shape, which converges toward the apex 400"*p*. The hollow portion 4 shown in FIG. 24E corresponds to the hollow potion 4 in FIG. 20D, but in FIG. 24E, a linear ridge line 400"*r* in FIG. 20D is altered into a round ridge surface 400"*r*. The inner wall surface of the partition wall 400" is composed of a planar pyramidal surface and a curved conical surface, which converge toward the apex 400"*p*.

The hollow portion 4 shown in FIGS. 20A to 20E may be provided in plural number at a desired position of the sole body 20 (cf. FIG. 13). In that case, the hollow portion 4 of a different shape may be combined. Also, by extending the hollow portion 4 in a direction perpendicular to the centerline of the hollow portion 4, the hollow portion 4 may have a tubular shape (cf. FIG. 11), or annular shape (cf. FIG. 5). In that case, regarding the sectional shape of the extended hollow portion 4, in the case of FIG. 20A, the sectional shape is like that of FIG. 19, in the case of FIG. 20B, the sectional shape is similar to that of FIG. 19 but the top surface 40A of the inner wall surface of the partition wall 40 is formed of an inverted V-shape, in the case of FIGS. 20C and 20D, the sectional shape is similar to that of FIG. 18 but the top surface 40A of the inner wall surface of the partition wall 40 is formed of an inverted V-shape, and in the case of FIG. 20E, the sectional shape is similar to those of FIGS. 20C, 20D but the inverted V-shaped top surface 40A of the inner wall surface of the partition wall 400" has a round apex part.

In the above-mentioned embodiment and the first to sixth alternative embodiments, the hollow portion 4 was provided at the heel region H, but the application of the present invention is not limited to such an example. The hollow portion 4 may be provided at the midfoot region M, the forefoot region F, or a region corresponding to the ball of the foot of the wearer. Also, the hollow portion 4 may be disposed at the entire region of the sole structure 2 in the longitudinal and lateral directions. Alternatively, the hollow portion 4 may be properly disposed at a desired position in any one of the regions.

Seventh Alternative Embodiment

Figure 21:
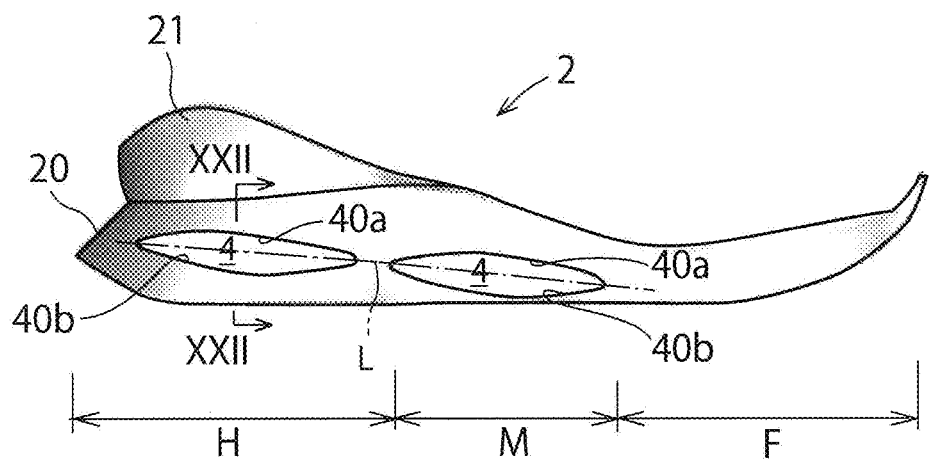
FIG. 21 is a medial side view of the sole structure according to the seventh alternative embodiment of the present invention.
Figure 22:
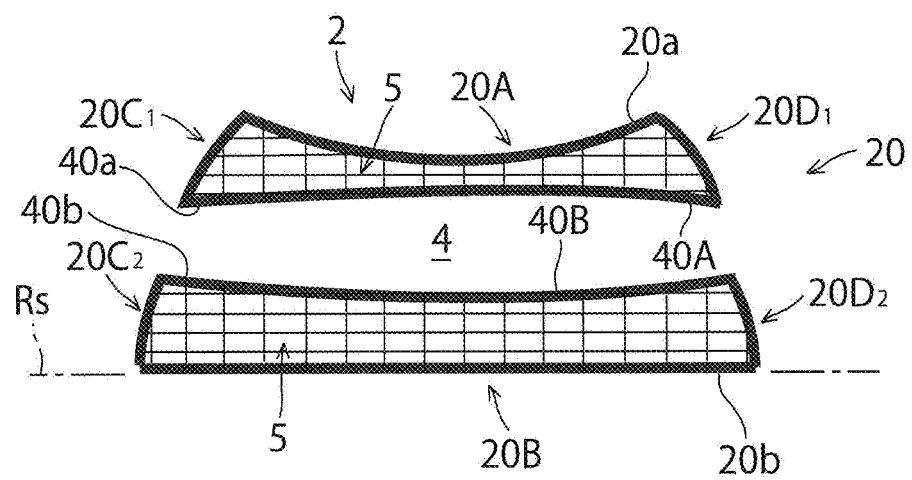
FIG. 22 is a cross sectional view of FIG. 21 taken along line XXII-XXII.

FIGS. 21 and 22 show a sole structure according to a seventh alternative embodiment of the present invention. In the drawings, like reference numbers indicate identical or functionally similar elements to those in the above-mentioned embodiment.

As shown in FIG. 21, in this seventh alternative embodiment, the hollow portion 4 is provided respectively at the heel region H and the midfoot region M of the sole body 20, which goes through the heel region H and the midfoot region M in the lateral direction (i.e. in the direction perpendicular to the page of the drawing). The hollow portion 4 may be an elongated void region in the longitudinal direction and has a biconvex shape or lenticular shape as viewed from the side. The hollow portion 4 is composed of an upper-side inner wall surface 40*a* having an upwardly convexly curved surface in the longitudinal direction and a lower-side inner wall surface 40*b* having a downwardly convexly curved surface in the longitudinal direction. The inner wall surfaces 40*a*, 40*b* are interconnected to one another at the respective longitudinal ends.

As shown in FIG. 22, a cross sectional view of FIG. 21 taken along line XXII-XXII, the hollow portion 4 is composed of an upper partition wall 40A and a lower partition wall 40B that respectively extend in the lateral direction and that are respectively formed of resin-made wall-shaped member. The wall surfaces disposed oppositely to one another between the partition walls 40A and 40B respectively form the upper-side inner wall surface 40a and the lower-side inner wall surface 40b. The upper-side inner wall surface 40a has an upwardly convexly curved surface in the lateral direction and the lower-side inner wall surface 40b has a downwardly convexly curved surface in the lateral direction. The upper partition wall 40A and the lower partition wall 40B extend in the longitudinal direction as well at opening edge portions on the medial and lateral sides of the hollow portion 4.

As shown in FIG. 22, the resin-fiber-made three-dimensional elastic fiber structure 5 is filled in a region enclosed by the upper wall portion 20A, both the sidewall portions $20C_1$, $20D_1$ of the sole body 20, and the partition wall 40A on the upper side of the hollow portion 4. The hollow portion 4 is in contact with the three-dimensional elastic fiber structure 5 via the partition wall 40A. Likewise, the resin-fiber-made three-dimensional elastic fiber structure 5 is filled in a region enclosed by the lower wall portion 20B, both the sidewall portions $20C_2$, $20D_2$ of the sole body 20, and the partition wall 40B on the lower side of the hollow portion 4. The hollow portion 4 is in contact with the three-dimensional elastic fiber structure 5 via the partition wall 40B. In other words, the sidewall portions $20C_1$, $20D_1$, $20C_2$, $20D_2$ are disposed between the upper wall 20A and the lower wall 20B, and the three-dimensional elastic fiber structure 5 is provided in an interior region between the upper wall 20A and the lower wall 20B.

In this seventh alternative embodiment as well, similar to the above-mentioned embodiment shown in FIGS. 1 to 10, at the time of impacting the ground, the sidewall portions $20C_1$, $20D_1$, $20C_2$, $20D_2$ and the three-dimensional elastic fiber structure 5 of the sole body 20 elastically deform, thereby exhibiting cushioning property and improving landing stability. At the same time, by the action of elastic repulsion resulting from elastic compressive deformation of the hollow portions 4 in contact with the three-dimensional elastic fiber structure 5, an elastic deformation of the three-dimensional elastic fiber structure 5 can be controlled, thereby controlling cushioning property and landing stability of the sole structure 2. Moreover, when an excessive compressive load is applied at the time of mechanical compression such as landing or shoemaking, not only an elastic repulsion resulting from an elastic compressive deformation of the hollow portion 4 is generated against the compressive load but also the wall-shaped member composing the partition walls 40A, 40B of the hollow portion 4 restrains deformation of the hollow portion 4, such that thereby an excessive compressive deformation of the hollow portion 4 can be restricted. As a result, an excessive deformation of the sole structure 2 can be prevented, thereby enhancing an excessive-deformation resistance of the sole structure 2.

Moreover, in this case, the hollow portion 4 goes through the sole body 20 in the lateral direction, such that thereby the sole body 20 is made much lighter in weight and the direction of deformation of the sole body 20 can be controlled according to the shape of the hollow portion 4. In this illustrated example, both of the hollow portions 4 respectively extend in the longitudinal direction, the front-side hollow portion 4 is located below the rear-side hollow portion 4 (see FIG. 21), and the longitudinal centerlines L of the hollow portions 4 are inclined downwardly to the front side. Therefore, the deformation of the sole body 20 can be controlled in such a way that sole deformation is transferred from the heel region H through the midfoot region M to the forefoot region F.

In addition, the hollow portion 4 may be disposed at only either one of the heel region H or the midfoot region M. Alternatively, it may be disposed at the forefoot region F. Also, the hollow portion 4 may go through only either one of the medial side or the lateral side of the sole body 20.

<Eighth Alternative Embodiment>

The structure of the three-dimensional elastic fiber structure 5 is not restricted to that shown in FIG. 7 of the above-mentioned embodiment, but it can employ other various structures.

Figure 23:
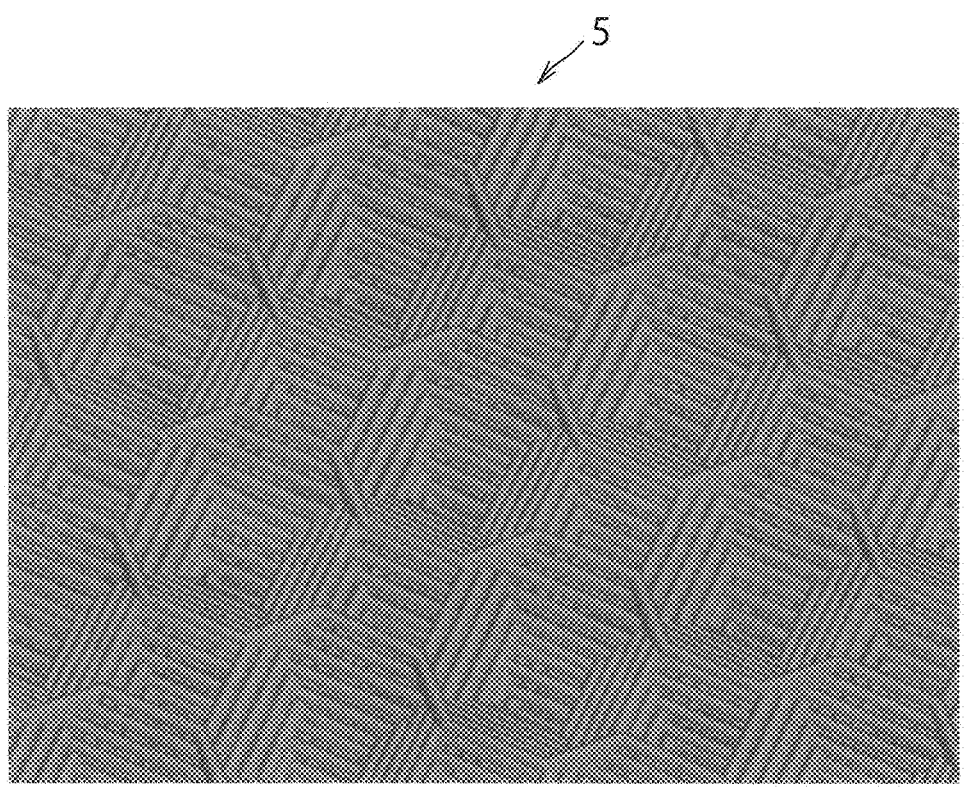
FIG. 23 illustrates the sole structure according to the eighth alternative embodiment of the present invention, showing a partial perspective view of the variant of the three-dimensional elastic fiber structure formed of resin fibers that constitutes the sole structure, viewed from diagonally above.

For example, in an example shown in FIG. 23, a plurality of resin filaments is arranged in a polygonal-shape on the horizontal plane to compose a resin layer and such a resin layer is vertically overlayed to constitute multiple layers.

FIG. 24 is a top plan schematic view to explain a basic module 50 constituting the three-dimensional elastic fiber structure 5 shown in FIG. 23. Different basic modules other than this module are conceivable, but the basic module 50 is taken as an example for convenience sake apart from a manufacturing process. The basic module 50 is composed of a first pattern 51 disposed at a topmost layer (a first layer) and shown by a solid line (see FIG. 24A), a second pattern 52 disposed at a second lower layer immediately adjacent and below the first layer and shown by a dash-and-dot-line (see FIG. 24B), a third pattern 53 disposed at a third lower layer immediately adjacent and below the second layer and shown by a double dotted line (see FIG. 24C), and a fourth pattern 54 disposed at a fourth lower layer immediately adjacent and below the third layer and shown by a dotted line (see FIG. 24D). The first to fourth patterns 51 to 54 are formed of resin filaments (resin fibers). A resin filament with a diameter of for example 0.3 to 0.5 mm may be used.

As shown in FIG. 24A, the first pattern 51 has a pair of octagonal frame bodies 51a spaced away from each other and a small square frame body 52a disposed between the frame bodies 51a. Opposite sides of the frame body 52a are shared with the sides of the frame bodies 51a. As shown in FIG. 24B, the second pattern 52 has a pair of square frame bodies 51b spaced away from each other and chamfered at every apex and a square frame body 52b smaller than the square frame bodies 51b disposed between the frame bodies 51b. Opposite sides of the frame body 52b are shared with the sides of the frame bodies 51b. As shown in FIG. 24C, the third pattern 53 has a pair of square frame bodies 51c spaced away from each other and a square frame body 52c larger than the square frame bodies 51c disposed between the frame bodies 51c and chamfered at every apex. Opposite sides of the frame body 52c are shared with the sides of the frame bodies 5ic. As shown in FIG. 24D, the fourth pattern 54 has a pair of small square frame bodies 51d spaced away from each other and a large octagonal frame body 52d disposed between the frame bodies 51d. Opposite sides of the frame body 52d are shared with the sides of the frame bodies 51d.

The first to fourth layers of the three-dimensional elastic fiber structure 5 are so structured as to dispose the first to fourth patterns 51 to 54 to cover and spread in each layer. The three-dimensional elastic fiber structure 5 is so structured as to overlay the first to fourth layers in the vertical direction and to contact and attach the vertically adjacent layers with one other via the resin filaments. Also, with regard to regions below the fourth layer, from the third pattern 53 to the second pattern 52 in order, and thereafter the first to fourth patterns 51 to 54 are repeated in ascending order and descending order.

In such a manner, in the three-dimensional elastic fiber structure 5, thin resin filaments extend laterally and longitudinally at predetermined spaces to form each layer in a horizontal plane. Then, each layer is overlaid to be connected to each other through the filaments in the vertical (i.e. thickness) direction to constitute a three-dimensional fiber structure 5. Therefore, in every direction as well as longitudinal, lateral and vertical directions, favorable elasticity can be achieved and dramatic weight-reduction is made possible compared to prior-art materials such as EVA, rubber and the like.

Then, a molding process of the above-mentioned sole structure 2 will be explained hereinafter.

When molding the sole structure 2 of the above-mentioned embodiment using a 3D printer, as shown in a dash-and-dot line of FIG. 4 in the above-mentioned embodiment, a reference plane (i.e. abase surface for a molded sole to be disposed on) Rs coincides with the bottom surface (i.e. ground-contact surface) 20b of the lower wall portion 20B of the sole body 20. That is, during sole molding by the 3D printer, the sole body 20 is molded on a horizontal posture such that the sole bottom surface is disposed on the reference plane Rs.

The same holds true for the above-mentioned first to seventh alternative embodiments. However, in the above-mentioned third alternative embodiment, it is preferable to adopt a reference plane other than the reference plane Rs. Because in the case of the third alternative embodiment, as shown in FIG. 17, the upper surface 40'A of the inner wall surfaces of the partition wall 40' composing the hollow portion 4' is formed of a planar surface and therefore during molding the upper surface 40'A using a soft resin by the 3D printer, it is likely that the soft resin will hang down.

FIG. 25A shows a preferred molding method for the sole structure 2 according to the above-mentioned third alternative embodiment. In the illustrated example, the sole structure 2 is molded in an upright standing posture with the heel rear end of the sole structure 2 contacted with the reference plane Rs. In this standing posture, the surface to be the upper surface of the inner wall surfaces of the partition wall 40' composing the hollow portion 4' is a circular or round surface (in FIG. 17, the circular or round surface 40'C/40'D). Therefore, it is unlikely that a soft resin will hang down during molding the upper surface using the soft resin by the 3D printer. In FIG. 25A, a plurality of pillar-shaped supports or support members Sp are provided at the heel rear end of the sole structure 2. These supports Sp are molded simultaneously with the sole structure 2 at the time of molding the sole structure 2 by the 3D printer and thereafter the supports Sp are cut and removed.

FIG. 25B shows an example in which the sole structure 2 according to the above-mentioned first alternative embodiment is also molded in a similar standing posture by the 3D printer. Since the hollow portions $4_1$, $4_2$ have a circular or round cross sectional shape in the first alternative embodiment, it is unlikely that the soft resin will hang down when molding the sole structure 2 in a horizontal posture by the 3D printer with the sole bottom surface disposed on the reference plane Rs. However, the sole structure in the first alternative embodiment can also be molded in the standing posture free from hanging-down of the soft resin. Because at a portion to be an upper surface of the inner wall surfaces of the partition walls $40_1$, $40_2$ composing the hollow portion $4_1$, $4_2$ during molding in the standing posture, a circular or round surface is disposed.

Of the various hollow portions that were shown in the above-mentioned sixth alternative embodiment, regarding a hollow portion having a conical shape or a pyramidal shape, that is, the hollow portion 4 respectively shown in FIGS. 20B to 20E, the bottom surface is formed of a planar surface. However, during molding by the 3D printer, if the bottom surface is not disposed at a position in which the bottom surface becomes a top surface of the inner wall surface of the hollow portion 4, for example, each of the apexes $400'p$, $400''p$ of the conical shape or the pyramidal shape is disposed at the topmost or uppermost position during molding, hanging-down of the soft resin during molding can be prevented.

In such a manner, if a circular or round shape, a curved shape, a conical shape, or a pyramidal shape is included at least at a portion of the inner wall surface composing the hollow portion in the sole structure 2, the posture of the sole structure 2 may be properly altered in such a way that such a circular or round, curved, conical, or pyramidal shape is disposed at an upper surface position of the hollow portion during molding by the 3D printer. By so doing, even in the event that a part of the inner wall surface composing the hollow portion has a planar surface, it makes possible not to dispose such a planar surface at the upper surface position of the hollow portion during molding. Thereby, molding by the 3D printer is possible without hanging-down the soft resin during molding.

<Other Application>

In the above-mentioned embodiment and the first to eighth alternative embodiments, an example was shown in which the sole structure according to the present invention was applied to a running shoe, but the application of the present invention is not restricted to such an example. The present invention also has application to walking shoes, soccer shoes, other sports shoes or shoes including sandals.

As mentioned above, the present invention is useful for a sole structure for a shoe that can easily control cushioning property and stability with a simple structure, and that can also improve excessive deformation resistance against excessive compression during loading.

Those skilled in the art to which the invention pertains may make modifications and other embodiments employing the principles of this invention without departing from its spirit or essential characteristics particularly upon considering the foregoing teachings. The described embodiments and examples are to be considered in all respects only as illustrative and not restrictive. The scope of the invention is, therefore, indicated by the appended claims rather than by the foregoing description. Consequently, while the invention has been described with reference to particular embodiments and examples, modifications of structure, sequence, materials and the like would be apparent to those skilled in the art, yet fall within the scope of the invention.

What is claimed is:

1. A shoe having a sole and an upper to cover a foot of a shoe wearer, said sole comprising:

an upper wall portion disposed on an upper side of said sole, wherein a top surface of said upper wall portion is fixedly attached to a bottom surface of said upper;

a lower wall portion disposed below and away from said upper wall portion, wherein a bottom surface of said lower wall portion constitutes a ground contact surface; and a pair of sidewall portions that are disposed on opposite sides of said upper wall portion and said lower wall portion, that are elastically deformable in a vertical direction, and that respectively constitute a side surface of said sole, wherein said upper wall portion, said lower wall portion and said pair of sidewall portions are formed of a resin-made wall-shaped member, and there is formed an interior region encompassed by said upper wall portion, said lower wall portion and said pair of sidewall portions, wherein said interior region contains a three-dimensional elastic fiber structure formed of resin fibers and a hollow portion encompassed by a partition wall formed of a resin-made wall-shaped member, wherein said three-dimensional elastic fiber structure is a filament structure in which a multiple of resin layers each composed of polygonally-and-horizontally arranged resin filaments are overlaid and attached to one another in the vertical direction through the resin filaments with a gap formed between the vertically adjacent resin filaments, wherein said upper wall portion, said lower wall portion, said pair of sidewall portions and said partition wall of said hollow portion are formed of the same material and integrally formed with one another, wherein said hollow portion is in contact with said three-dimensional elastic fiber structure through said partition wall, and wherein there is formed a vertical clearance between said partition wall of said hollow portion, said upper wall portion, and said lower wall portion and said three-dimensional elastic fiber structure fills said vertical clearance.

2. The shoe according to claim 1, wherein said pair of sidewall portions extend substantially in the vertical direction and connect between said upper wall portion and said lower wall portion, said upper and lower wall portions and said pair of sidewall portions constitute a box-shaped member, and said hollow portion is disposed inside said box-shaped member.

3. The shoe according to claim 1, wherein said hollow portion goes through said sole in a lateral direction.

4. The shoe according to claim 1, wherein at least a part of an inside wall surface of said partition wall of said hollow portion is formed of a circular arc-shaped surface, a curved surface, a conical surface, or a pyramidal surface.

5. The shoe according to claim 1, wherein said three-dimensional elastic fiber structure is formed by an additive manufacturing through a 3D printer along with said respective wall-shaped members of said upper and lower wall portions, said pair of sidewall portions and said hollow portion.

6. The shoe according to claim 5, wherein said 3D printer is a fused-deposition-modeling type.

7. The shoe according to claim 1, wherein said upper wall portion, said lower wall portion, said pair of sidewall portions and said partition wall of said hollow portion are also formed of resin fibers as with said three-dimensional elastic fiber structure, whereby the entire sole is formed of the same resin fibers.

* * * * *